United States Patent
Ramu

(12) United States Patent    (10) Patent No.: US 7,034,422 B2
Ramu    (45) Date of Patent: Apr. 25, 2006

(54) RADIAL-AXIAL ELECTROMAGNETIC FLUX ELECTRIC MOTOR, COAXIAL ELECTROMAGNETIC FLUX ELECTRIC MOTOR, AND ROTOR FOR SAME

(75) Inventor: Krishnan Ramu, Blacksburg, VA (US)

(73) Assignee: Virginia Tech Intellectual Properties, Inc., Blackburg, VA (US)

( * ) Notice: Subject to any disclaimer, the term of this patent is extended or adjusted under 35 U.S.C. 154(b) by 0 days.

(21) Appl. No.: 10/995,557

(22) Filed: Nov. 24, 2004

(65) Prior Publication Data

US 2005/0151437 A1    Jul. 14, 2005

Related U.S. Application Data

(63) Continuation of application No. PCT/US03/16628, filed on May 27, 2003.

(60) Provisional application No. 60/382,608, filed on May 24, 2002, provisional application No. 60/382,609, filed on May 24, 2002, provisional application No. 60/382,610, filed on May 24, 2002.

(51) Int. Cl.
   *H02K 33/12*    (2006.01)
   *H02K 16/04*    (2006.01)
   *H02K 1/24*    (2006.01)

(52) U.S. Cl. ................ 310/114; 310/112; 310/166; 310/269

(58) Field of Classification Search ............... 310/112, 310/114, 166, 261, 266, 269
See application file for complete search history.

(56) References Cited

U.S. PATENT DOCUMENTS

| | | | | |
|---|---|---|---|---|
| 3,396,296 | A * | 8/1968 | Esters | 310/266 |
| 3,426,224 | A * | 2/1969 | Esters | 310/46 |
| 3,467,845 | A * | 9/1969 | Wesolowski | 310/168 |
| 3,602,749 | A * | 8/1971 | Esters | 310/154.21 |
| 3,729,642 | A * | 4/1973 | Esters | 310/112 |
| 4,031,421 | A * | 6/1977 | Geiger | 310/112 |
| 4,114,057 | A * | 9/1978 | Esters | 310/46 |
| 4,203,784 | A * | 5/1980 | Kuroki et al. | 148/111 |
| 4,488,075 | A * | 12/1984 | DeCesare | 310/156.22 |
| 5,864,197 | A * | 1/1999 | Naito et al. | 310/261 |
| 5,952,756 | A * | 9/1999 | Hsu et al. | 310/156.35 |
| 6,426,577 | B1 * | 7/2002 | Sekiyama et al. | 310/162 |

\* cited by examiner

*Primary Examiner*—Burton Mullins
(74) *Attorney, Agent, or Firm*—Stevens, Davis, Miller & Mosher, LLP

(57) ABSTRACT

A rotor for an electrical motor may include a plurality of salient radial field rotor poles and a plurality of salient axial field rotor poles. The radial field rotor poles and the axial field rotor poles are respectively oriented on the rotor to receive or convey substantially perpendicular flux fields. Additionally, the radial field rotor poles may include both inner and outer peripheral rotor poles for communicating radial flux fields with separate coaxial stators.

66 Claims, 15 Drawing Sheets

RADIAL-AXIAL ELECTROMAGNETIC FLUX ELECTRIC MOTOR, COAXIAL ELECTROMAGNETIC FLUX ELECTRIC MOTOR, AND ROTOR FOR SAME

This is a continuation application of PCT/US03/16628 filed May 27, 2003, which is based on provisional applications 60/382,608, 60/382,609, and 60/382,610 all filed on Nov. 24, 2002.

CROSS-REFERENCE TO RELATED APPLICATIONS

This application claims priority to Provisional Application Nos. 60/382,608, 60/382,609, and 60/382,610. Additionally, the application hereby incorporates by reference the disclosures provided in Applicant's co-pending PCT International applications filed on the same date herewith, having Attorney Docket Nos. L1081.03101, L1081.03102, L1081.03103, and L1081.03105 and filed herewith.

BACKGROUND OF THE INVENTION

1. Field of the Invention

The invention relates to radial-axial electromagnetic flux electric motors, coaxial electromagnetic flux electric motors, and rotors for a radial-axial electric motor.

2. Description of Related Art

Many high performance applications, such as electric actuators in aircraft and variable speed motor drives used in defense underwater applications, require highly compact, low mass, and low volume electrical machines. The power density of these high performance electrical machines may be quantified in units of Watt/lb, hp/lb, or kW/Kg to express the power density relative to weight and in units of W/in$^3$ or hp/in$^3$ or kW/m$^3$, to express the machine's power density relative to its volume. When the electrical machine's power is expressed relative to its weight or volume, the relevant power density metric is more readily identifiable.

One way of increasing the power density of an electrical machine is to operate the machine at high speed. Since the machine's power is proportional to the speed at which it operates, higher operational speed provides higher machine power, so long as the flux in the machine is kept constant. Electrical machines with one stator and one rotor are also used to obtain high speed and, thereby, high power density. Additionally, high energy density and high flux density permanent magnets are used in electrical machines to improve their power densities. In all high density machines, though, the one stator and one rotor concept is widely applied.

High power density machines are mostly employed in applications requiting high reliability, such as is required in military and aircraft applications. Usually, related art high power density machines, such as permanent magnet synchronous machines (PMSMs) and permanent magnet brushless direct current (dc) machines (PMBDCMs), are not capable of providing high reliability under all operating conditions.

For instance, consider a machine experiencing a short circuit of one phase winding, while the machine is operating. The short circuit causes a large current to flow in the effected winding. Because the effected phase winding is mutually coupled with the other phase windings of the machine, the short circuit current also affects the operation of these other windings. As a result, these other windings are not able to operate in a normal manner, since they may require higher than nominal voltages to operate. The short circuit will bleed power from the source and put it to waste, resulting in low power efficiency. Therefore, such consequences are undesirable.

U.S. Pat. Nos. 3,396,296, 3,602,749, 3,729,642, and 4,114,057 disclose machines employing two stators and one rotor in the radial direction. Each of these patents describe a brush dc machine, with a commutator and two stators, that use permanent magnet excitation both in the radial and axial direction to maximize the induced electromotive force (emf) and, hence, the machine torque. The rotor has the windings and a commutator on its shaft. Since only one winding is used on the rotor to generate torque, the machine's ability to operate with a fault is low or non-existent. Though these patents describe techniques for increasing efficiency, they do little to advance the fault tolerance of the machines.

U.S. Pat. No. 6,373,160 discloses an electric machine with one stator winding and two separate rotors, whose rotational speeds may differ. The disclosed structure is achieved by extending the machine in the axial direction and diminishing the volume of space between the two rotor shafts, thus significantly reducing the power density of the machine. Also, a fault occurring in the stator winding prevents power from being applied to either rotor shaft. These shortcomings limit the applications to which this machine may be applied.

U.S. Pat. No. 6,497,201 discloses a switched reluctance machine architecture having two rotors and two stators. The two rotors are separate but concentrically disposed. The stators are disposed between the inner and outer rotors and are concentrically placed with respect to the rotors. A first rotor and stator pair constitutes a first electrical motor and a second rotor stator pair constitutes a separate, second electrical motor. These two motors are disposed concentrically about one another. The disadvantage of this motor architecture is that it increases the rotor inertia, which is proportional to the fourth power of the diameter. The increased rotor inertia reduces the acceleration of the machine shaft and decreases the dynamic response of the machine to load changes. Also, this architecture does not advance the art in terms of arranging the relative placement of the motors, arranging the stator windings of the motors, and the magnetic arrangement of the rotors.

All reference material cited herein is hereby incorporated into this disclosure by reference.

SUMMARY OF THE INVENTION

In one embodiment of the invention, two electrical motors of an electric machine share one rotor, and each of the two motors has a separate stator with field windings. The shared rotor has both a radial and an axial field arrangement. End bells of the machine house the axial set of stator windings, which generate the flux flowing through the rotor in the axial direction. A first electrical motor of the pair includes first radial field rotor poles and first stator poles, with their associated windings or magnets. A second electrical motor includes second rotor poles and second stator poles, with their associated axial-field generating windings or magnets. The first and second rotor poles are disposed on the same shaft, and the second stator poles are housed on the end bells of the electrical machine; The end bells and rotor shaft are common to both the first and second electrical motors. These two motors can be independently operated and may comprise one kind of dc motor technology for the first motor, such as PMBDCM technology, and a second kind of technology for the second motor, such as switched reluctance machine (SRM) or induction technology.

In another embodiment of the invention, a rotor is disposed between two stators to create an inner electric motor, comprising the rotor and inner stator, and an outer motor, comprising the rotor and outer stator. The electrical motors may be of a switched reluctance, PMBDCM, or induction kind, and both motors may be of the same or a different kind.

The invention provides numerous high power density machines that offer high reliability, by comparison to related art machines. These features are achieved by using two stators instead of one, as in related art architectures. The use of multiple stators increases the stator-dependent reliability of the architecture. Also, the invention uses the same rotor to combine both axial and radial field motors, even though the stators are in the radial and axial directions, respectively.

Therefore, an object of the present invention is to overcome the shortcomings and problems encountered in related art devices.

Another object of the invention is to provide a high power density electrical machine.

Still another object of the invention is to provide a high power density electrical machine having high reliability.

A further object of the invention is to provide a high power density electrical machine having high fault tolerance.

A further object of the invention is to provide an electrical machine that increases the power output for a given volume of space taken by the motor.

The objects of the present invention may be achieved in whole or in part by a rotor for an electrical motor having a plurality of salient radial field rotor poles and a plurality of salient axial field rotor poles. The radial field rotor poles and the axial field rotor poles are respectively oriented on the rotor to receive or convey substantially perpendicular flux fields.

The objects of the present invention may be further achieved in whole or in part by an axial-radial electric machine including a rotor, a radial field stator, and an axial field stator. The rotor has a radial field rotor portion and an axial field rotor portion. Each of the radial field and axial field rotor portions has a plurality of salient rotor poles. The radial field stator has a plurality of salient stator poles that convey radially oriented electromagnetic fluxes to the radial field rotor poles, and the axial field stator has a plurality of salient stator-poles that convey axially oriented electromagnetic fluxes to the axial field rotor poles. The radially oriented fluxes are substantially perpendicular to the axially oriented fluxes.

The objects of the present invention may be further achieved in whole or in part by a coaxial electric machine including a rotor, an outer stator, and inner stator. The rotor has a plurality of salient inner and outer peripheral rotor poles. The outer stator has a plurality of salient stator poles that convey outer electromagnetic fluxes to the outer peripheral rotor poles, and the inner stator has a plurality of salient stator poles that convey inner electromagnetic fluxes to the inner peripheral rotor poles. The inner and outer electromagnetic fluxes are both radially oriented with respect to an axis of rotation for the rotor.

The objects of the present invention may be further achieved in whole or in part by an axial-radial electric machine including a rotor having a radial field rotor and an axial field rotor. The radial field rotor has a plurality of salient inner and outer peripheral rotor poles, and the axial field rotor has a plurality of salient rotor poles. Additionally, the electric machine has an outer radial field stator, having a plurality of salient stator poles that convey outer radially oriented electromagnetic fluxes to the outer peripheral radial field rotor poles, and an inner radial field stator having a plurality of salient stator poles that convey inner radially oriented electromagnetic fluxes to the inner peripheral radial field rotor poles. Also, an axial field stator of the electric machine has a plurality of salient stator poles that convey axially oriented electromagnetic fluxes to the axial field rotor poles. The radially oriented fluxes are substantially perpendicular to the axially oriented fluxes.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

To significantly increase the power density of an electric machine, the unutilized space of the machine must be put to use. This unutilized space may be found in the rotor and in the stator end bells. To put this space to use, without increasing the stator volume, or at least unduly so, an axial-flux switched reluctance machine (SRM) motor may be disposed on a regular, radial-flux SRM motor. Axial flux flows in the axial direction of the machine and an axial field produces this flow. Under the influence of a radial field, a radial flux flows along a radius of the machine's axial shaft and perpendicular to the machine's axial direction. In this way, a pair of radial and axial flux motors may share a single rotor.

Figure 1A:
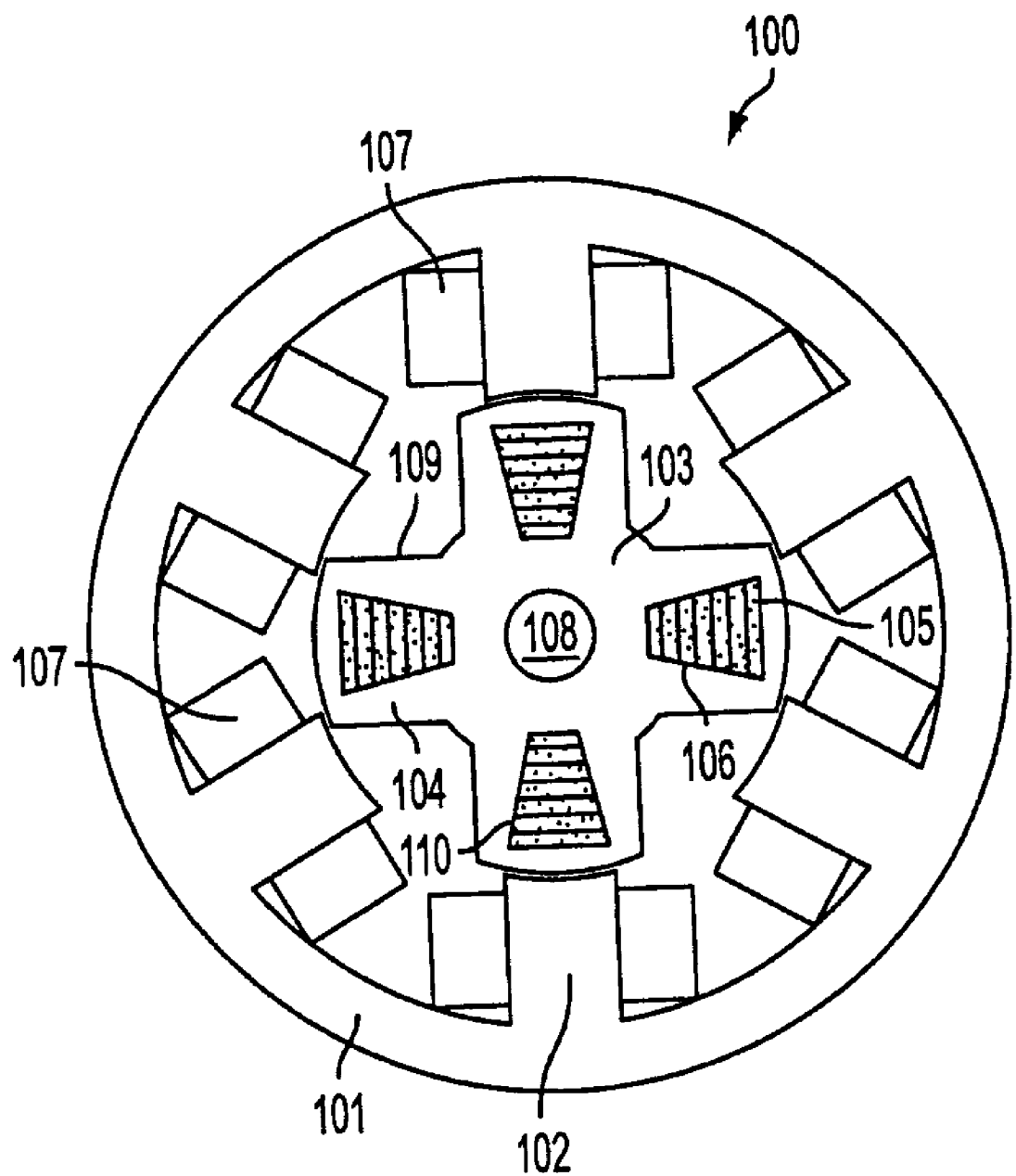
FIG. 1(a) illustrates a hybrid axial-radial machine (HARM) having axial-field rotor poles centrally disposed within radial field rotor poles of the HARM.
Figure 1B:
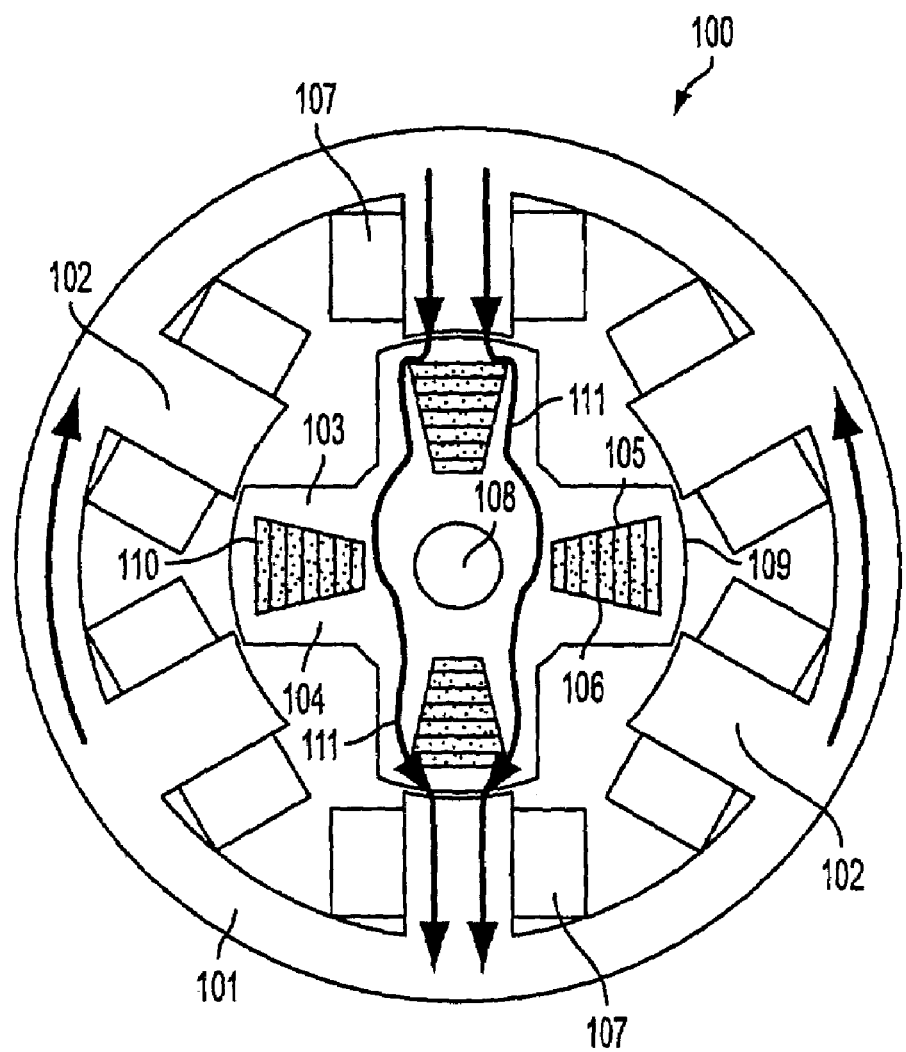
FIG. 1(b) illustrates a radial flux path through the HARM illustrated by FIG. 1(a)

FIG. 1(a) illustrates a hybrid axial-radial machine (HARM) having axial-field rotor poles centrally disposed within radial field rotor poles of the HARM. FIG. 1(b) illustrates a radial flux path through the HARM illustrated by FIG. 1(a). HARM 100 includes a stator 101 having multiple salient stator poles 102 and a rotor 103 having multiple salient rotor poles 104. All combinations of stator and rotor pole combinations are included in this invention, though a six-pole stator 101 and four-pole rotor 103 are illustrated in FIG. 1(a) for convenience. Rotor 103 rotates about an axial shaft 108 under the influence of an radial field electromagnetic flux 111 produced by radial stator windings 107 and another electromagnetic flux (not shown) produced by axial stator windings (not shown).

Each of rotor poles 104 is punched or otherwise formed to have slots 105 (i.e., openings) through the respective rotor pole. These slots may have any shape and may be placed anywhere on rotor 103, but are illustrated in FIG. 1(a) as pie-shaped wedges that are centrally located on rotor poles 104. Rotor slots 105 are filled with axial field laminations 106.

Rotor poles 104 provide radial field poles 109 through which a radial field flux 111 flows. Similarly, axial field laminations 106 provide axial field poles 110 through which an axial field flux (not shown) flows.

Figure 2:
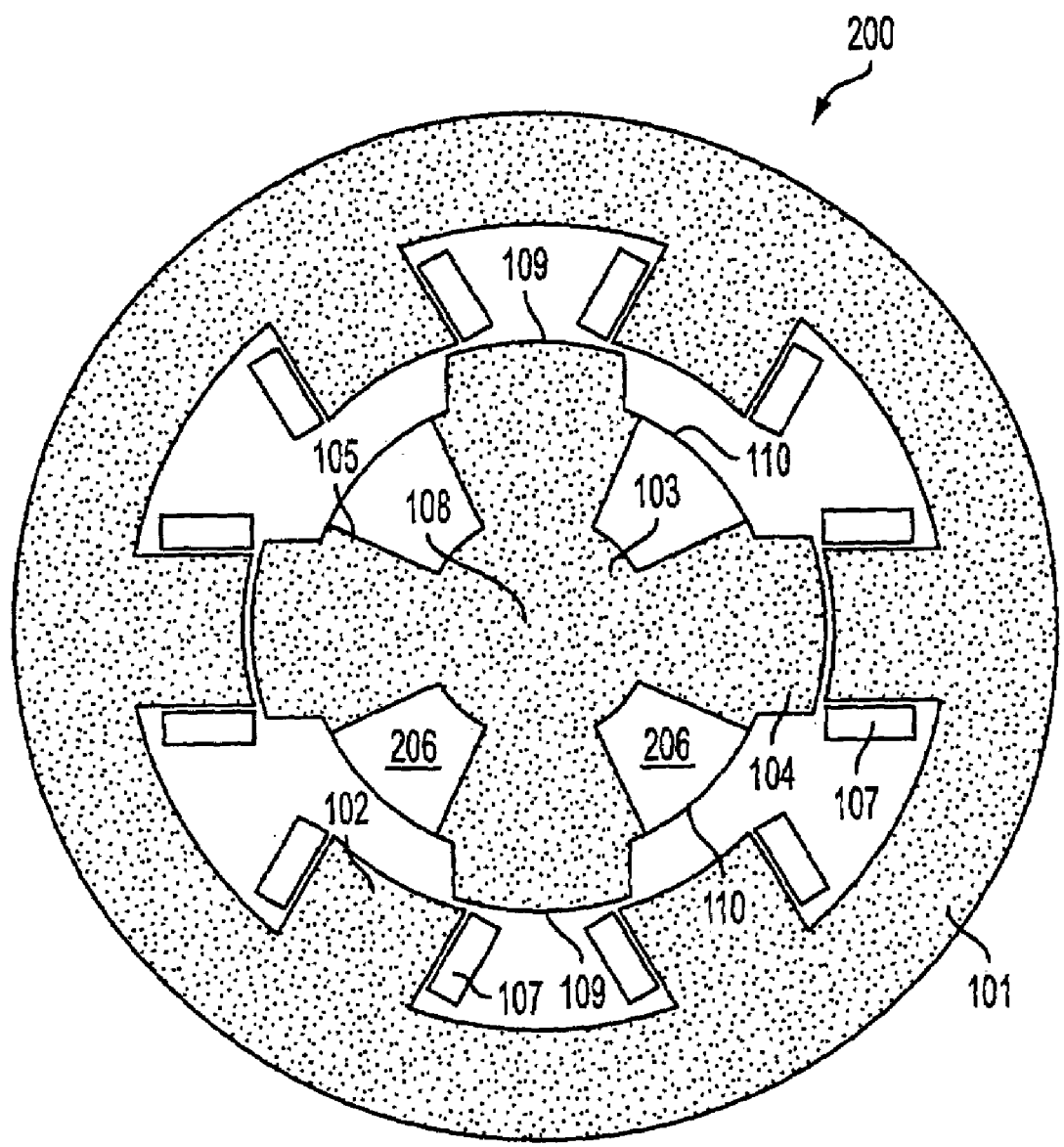
FIG. 2 illustrates a HARM having axial-field rotor poles disposed between radial field rotor poles of the HARM.

FIG. 2 illustrates a HARM having axial-field rotor poles disposed between radial field rotor poles of the HARM. HARM 200 includes a stator 101 having six salient stator poles 102 and a rotor 103 having four salient rotor poles 104. Rotor 103 rotates about an axial shaft 108 under the influence of an electromagnetic flux produced by radial stator windings 107 and another electromagnetic flux produced by axial stator windings (not shown).

Slots 105 are formed in an interpolar region of each adjacent pair of rotor poles 104 and filled with axial field laminations 206. Rotor poles 104 provide radial field poles 109 through which a radial field flux flows, and axial field laminations 206 provide axial field poles 110 through which an axial field flux flows.

The interpolar regions of rotor poles 104 are well suited for holding axial field laminations 206, since these regions are insubstantially used by the radial field flux. Moreover, placing axial field laminations 206 in the interpolar regions does not diminish the effective rotor pole area that is available for carrying radial field flux and, therefore, does not increase the flux density in rotor poles 104. Preventing an increase of flux density also prevents increased core losses.

Moreover, the interpolar space and back iron is highly unutilized in conventional radial SRM configurations. Therefore, the interpolar placement of axial field poles 110 is preferable to placing them inside radial field poles 109.

Figure 3:
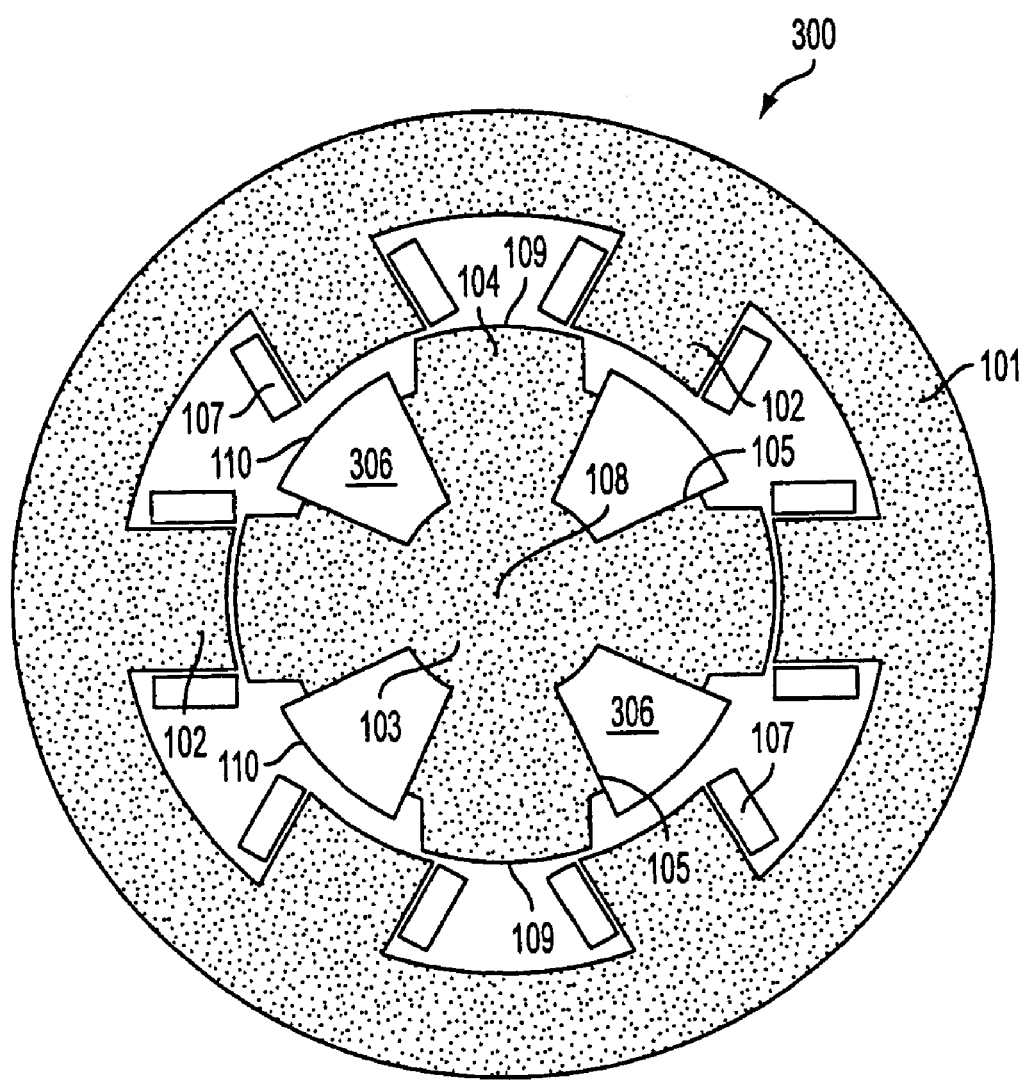
FIG. 3 illustrates the HARM of FIG. 2 with extended axial-field rotor poles.

FIG. 3 illustrates the HARM of FIG. 2 with extended axial-field rotor poles. HARM 300 includes a stator 101 having six salient stator poles 102 and a rotor 103 having four salient rotor poles 104. Rotor 103 rotates about an axial shaft 108 under the influence of an electromagnetic flux produced by radial stator windings 107 and another electromagnetic flux produced by axial stator windings (not shown).

Slots 105 are formed in the interpolar region of each adjacent pair of rotor poles 104 and filled with axial field laminations 306. HARM 300 is similar to HARM 200 in most respects, except that axial field laminations 306 extend beyond the arcuate periphery of rotor 103, in its interpolar regions.

Axial field poles 110 could potentially provide a path for the radial field flux to flow. Similarly, radial field poles 109 could potentially provide a path for the axial field flux to flow. When either event occurs, high eddy-current losses are experienced in the axial or radial field poles providing the undesirable flux path. To diminish the likelihood of these events or mitigate their effects, the following techniques may be employed:

1. Using oriented magnetic steel for axial field poles 110;
2. Providing an air gap between axial field poles 110 and the surrounding rotor laminations; and
3. Providing additional back iron on each end of rotor 103 for the axial field flux.

According to the first technique, oriented magnetic steel is employed for axial field poles 110, and the magnetic steel is oriented in the direction of the axial flux path. The oriented steel creates a high resistivity to the radial flux-induced emf, thereby resulting in lower losses.

Figure 4:
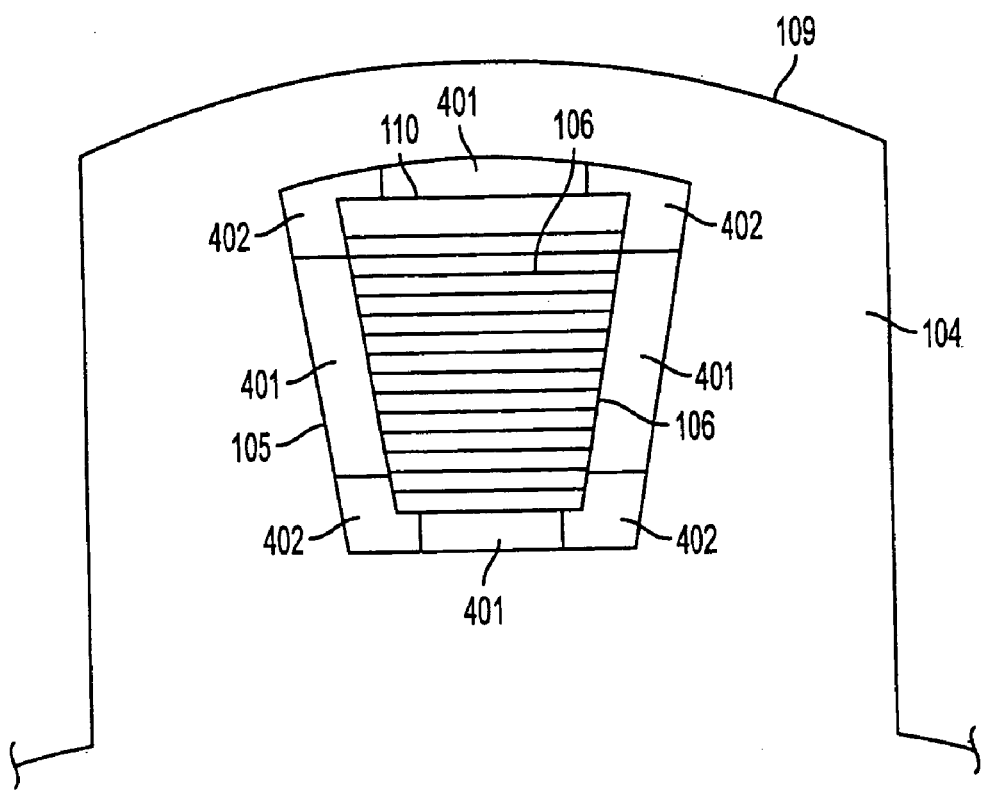
FIG. 4 illustrates a rotor pole having an air gap separating an axial field rotor pole from a radial field rotor pole.

According to the second technique, an air gap is provided between axial field poles 110 and the surrounding rotor laminations. FIG. 4 illustrates a rotor pole having an air gap separating an axial field rotor pole from a radial field rotor pole. Rotor pole 104 has a wedge-shaped slot 105 formed therein. An axial field lamination 106 is secured by its four corners within slot 105 by four wedges 402. An air gap 401 exists on each side of axial field lamination 106 between the four wedges 402. Together, wedges 402 and air gap 401 surround the periphery of axial field lamination 106 to separate it from rotor pole 104.

Rotor pole 104 provides a radial field pole 109 through which the radial field flux flows, and axial field lamination 106 provides an axial field pole 110 through which axial field flux flows.

Although four wedges 402 are illustrated in FIG. 4, any number of wedges may be used. The placement and number of wedges 402 are selected in accordance with their application. Wedges 402 are non-magnetic and may secure axial field lamination 106 to rotor pole 104 by a number of welds.

Figure 5A:
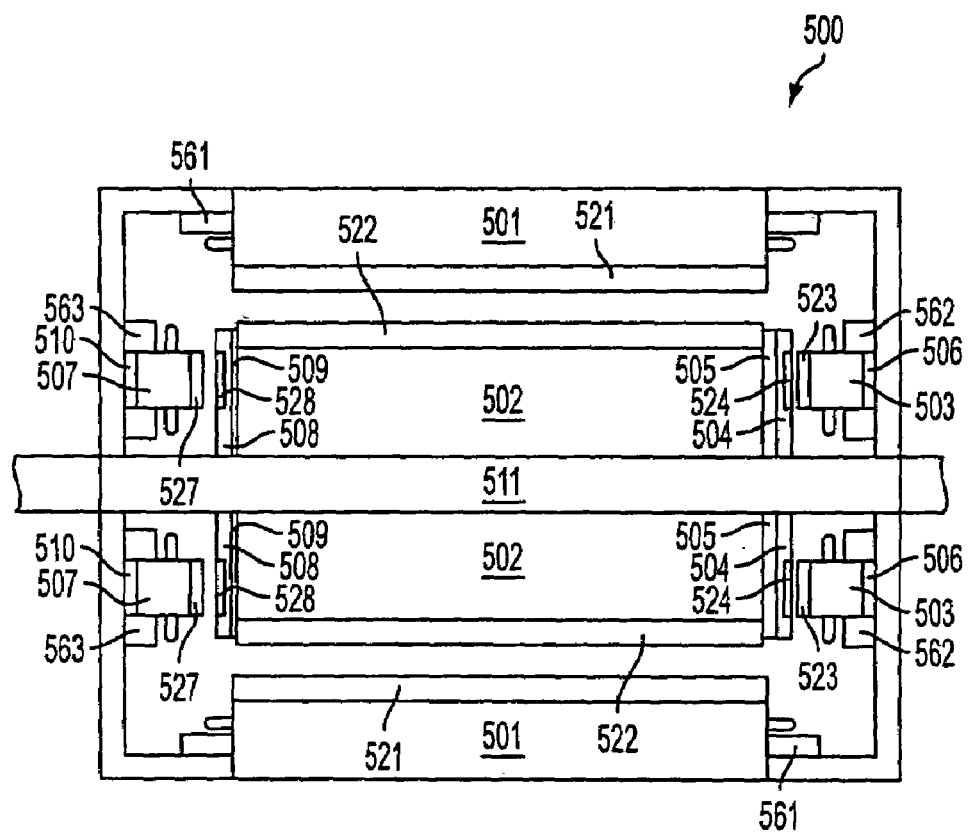
FIG. 5(a) illustrates a HARM having one radial and two axial field motors.

The first two techniques for eliminating eddy-current losses, described above, are useful when axial field poles 110 are placed through all of the rotor laminations, such as is done for short stack length machines. The stack length refers to the length of rotor 103 along its axial shaft 108. For long stack machines, threading axial field poles 110 all along the rotor shaft results in increased weight, a longer length for the axial flux to flow, and higher core losses. Therefore, a third technique is desirable for long stack machines. According to the third technique, a back iron for carrying the axial flux can be attached at each end of the rotor. FIG. 5(a) illustrates a HARM having one radial and two axial field motors. HARM 500 has a radial field stator 501, a radial field rotor 502, a first axial field stator 503, a first axial field rotor 504, a first axial field rotor back iron 505, a first axial field stator back iron 506, a second axial field stator 507, a second axial field rotor 508, a second axial field rotor back iron 509, a second axial field stator back iron 510, and a rotor shaft 511. Radial field stator 501 has salient radial field stator poles 521, radial field rotor 502 has salient radial field rotor poles 522, first axial field stator 503 has salient first axial field stator poles 523, first axial field rotor 504 has salient first axial field rotor poles 524, second axial field stator 507 has salient second axial field stator poles 527, and second axial field rotor 508 has salient second axial field rotor poles 528.

Figure 5B:
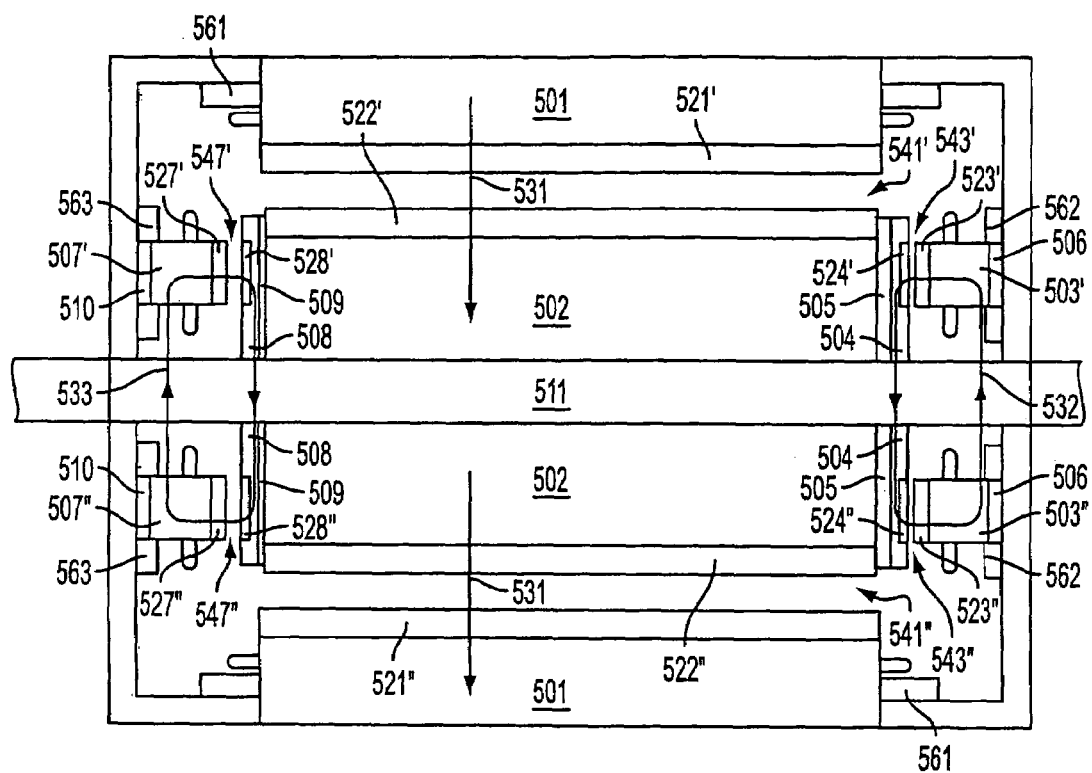
FIG. 5(b) illustrates the radial and axial field flux paths providing one direction of rotor rotation for the HARM illustrated by FIG. 5(a)

FIG. 5(*b*) illustrates the radial and axial field flux paths providing one direction of rotor rotation for the HARM illustrated by FIG. 5(*a*). Radial field flux 531, which is generated by a current flowing through radial field stator windings (not shown), flows through radial field stator 501 to radial field stator pole 521', flows across a radial field air gap 541' into radial field rotor pole 522', flows into radial field rotor 502 and then into radial field rotor pole 522", flows across radial field air gap 541" into radial field stator pole 521", and flows back into radial field stator 501. First axial field flux 532, which is generated by a current flowing through first axial field stator windings (not shown), flows through first axial field stator 503 to first axial field stator pole 523', flows across a first axial field air gap 543' into first axial field rotor pole 524', flows into first axial field rotor 504 and then first axial field rotor pole 524", flows across first axial field air gap 543" into first axial field stator pole 523" and back into first axial field stator 503. Similarly, second axial field flux 533, which is generated by a current flowing through second axial field stator windings (not shown), flows through second axial field stator 507 to second axial field stator pole 527', flows across a second axial field air gap 547' into second axial field rotor pole 528', flows into second axial field rotor 508 and then into second axial field rotor pole 528", flows across second axial field air gap 547" into second axial field stator pole 527" and back into second axial field stator 507.

First and second axial field rotor back irons 505, 509 prevent radial field flux 531 from entering first and second axial field rotors 504 and 508, respectively. Similarly, first and second axial field rotor back irons 505, 509 prevent first and second axial field fluxes 532 and 533, respectively, from entering radial field rotor 502. First and second axial field stator back irons 506, 510 prevent first and second axial field fluxes 532 and 533, respectively, from entering radial field stator 501. Similarly, first and second axial field stator back irons 506, 510 prevent radial field flux 531 from entering axial field stators 503 and 507, respectively.

Each of radial field flux 531, first axial field flux 532, and second axial field flux 533 independently produces torque to rotate radial field rotor 502 in the same direction about the axis of rotor shaft 511. Reversing the respective field fluxes sequence will cause each to independently produce torque to rotate radial field rotor 502 in the opposite direction.

HARM 500 provides the following advantages:
1. The problem of providing a path for the radial flux without interfering axial flux is practical only with this arrangement.
2. The flux path length in the axial direction is reduced.
3. The machine has two axial field stators 503, 507 and two axial field rotors 504, 508 that cooperate to provide two independent electromagnetic motors, in addition to the independent electromagnetic motor provided radial field stator 501 and radial field rotor 502. Therefore, HARM 500 has three independent electromagnetic motors for rotationally driving radial field rotor 502.
4. HARM 500 has high reliability, due to the independence of the one radial and two axial motors.
5. Assuming each of the radial and axial field motors have m independent phases, HARM 500 provides 3m independent phases for operation and, hence, even greater reliability. However, each motor need not have m independent phases, but may have i, j, and k independent phases, respectively.
6. HARM 500 may employ any of the various prospective rotor poles arrangements illustrated in FIGS. 1–4, to produce the axial and radial field actions.
7. HARM 500 is also applicable for use with a short stack rotor machine.
8. Axial field rotor poles 524, 528 extend well beyond radial field rotor poles 522, along the axis of rotor shaft 511, so that axial field stator poles 523, 527 may be disposed in a manner that does not mechanically interfere with the radial and axial field stator windings (not shown).

Figure 6A:
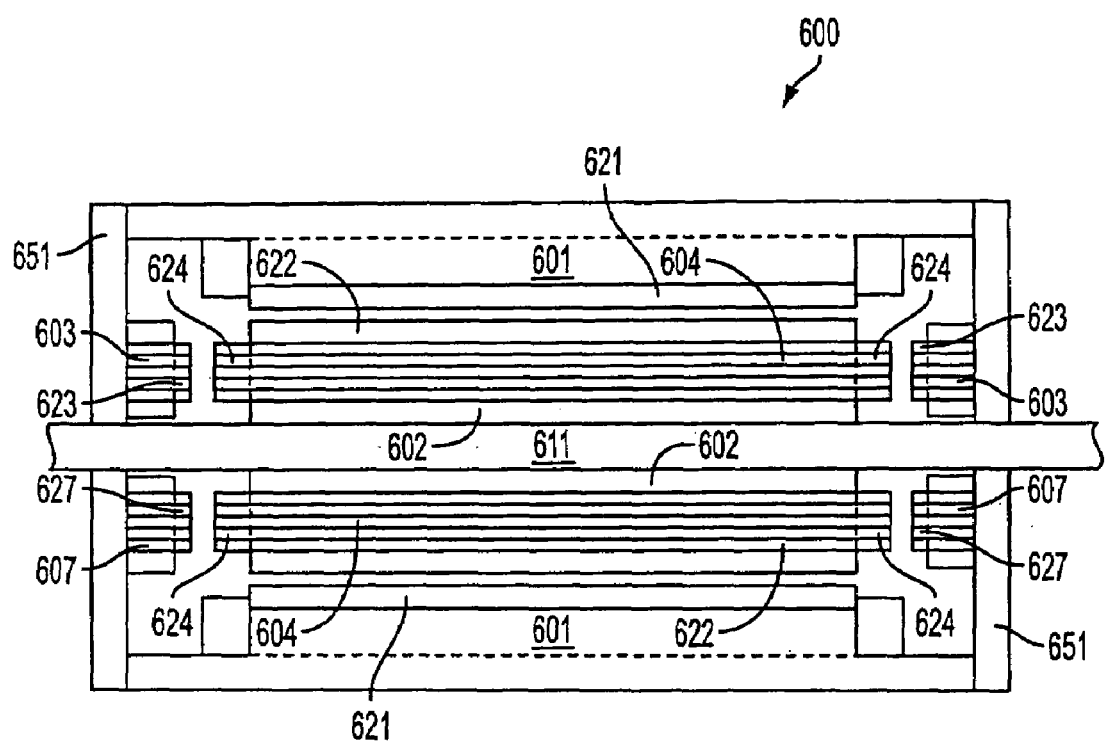
FIG. 6(a) illustrates another HARM having one radial and one or two axial field motors.
Figure 6B:
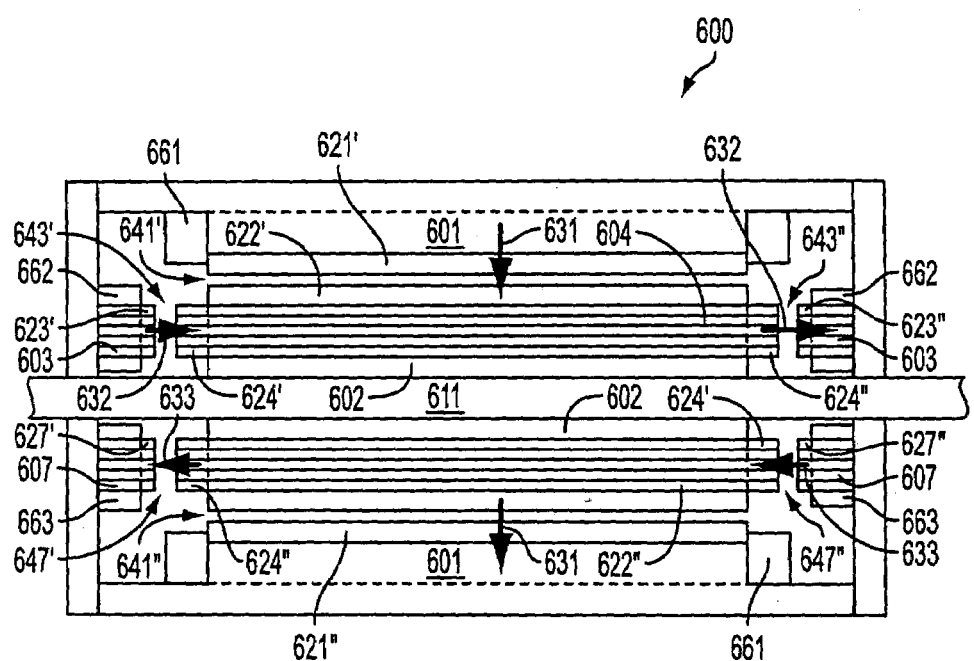
FIG. 6(b) illustrates the radial and axial field flux paths providing one direction of rotor rotation for the HARM illustrated by FIG. 6(a)

FIG. 6(*a*) illustrates another HARM having one radial and one or two axial field motors. HARM 600 has a radial field stator 601, a radial field rotor 602, a first axial field stator 603, a first axial field rotor 604, a second axial field stator 607, and a rotor shaft 611. Radial field stator 601 has salient radial field stator poles 621, radial field rotor 602 has salient radial field rotor poles 622, first axial field stator 603 has salient first axial field stator poles 623, first axial field rotor 604 has salient first axial field rotor poles 624, second axial field stator 607 has salient second axial field stator poles 627 and it faces the axial field rotor poles 624. First and second axial field stator 603 and 607, respectively, are mounted on end bells 651.

FIG. 6(*b*) illustrates the radial and axial field flux paths providing one direction of rotor rotation for the HARM illustrated by FIG. 6(*a*). Radial field flux 631, which is generated by a current flowing through radial field stator windings 661, flows through radial field stator 601 to radial field stator pole 621', flows across a radial field air gap 641' into radial field rotor pole 622', flows into radial field rotor 602 and then into radial field rotor pole 602", flows across radial field air gap 641" into radial field stator pole 621", and flows back into radial field stator 601. First axial field flux 632, which is generated by a current flowing through first axial field stator windings 662, flows through first axial field stator 603 to first axial field stator pole 623', flows across a first axial field air gap 643' into first axial field rotor pole 624', flows into first axial field rotor 604 and then into first axial field rotor pole 624", flows across first axial field air gap 643" into first axial field stator pole 623", and flows back into first axial field stator 603 through the back iron of the stator pole 623", axial stator pole 627", axial air gap 647", rotor pole 633, air gap 641", stator field pole 627' and its back iron, and then on to field stator pole 603.

Each of radial field flux 631, first axial field flux 632, and second axial field flux 633 independently produces torque to rotate rotor 602 in the same direction about the axis of rotor shaft 611. Reversing the sequence of respective field fluxes will cause each to independently produce torque to rotate rotor 602 in the opposite direction.

HARM 600 has two axial field stators 603, 607 and one axial field rotor 604 that cooperate to provide two independent electromagnetic motors, in addition to the independent electromagnetic motor provided by radial field stator 601 and radial field rotor 602. Therefore, HARM 600 has two independent electromagnetic motors for rotationally driving rotor 602. Assuming each of the radial and axial field motors have m independent phases, HARM 600 provides 2m independent phases for operation and, hence, even greater reliability. However, each motor need not have m independent phases, but may have i and j independent phases, respectively. HARMs 500 and 600 may alternatively be configured as 2m independent phase machines, by introducing some dependence between two of the machine phases. Here again, each motor need not have m independent phases, but may have i and j independent phases, respectively.

In summary, HARMs 500 and 600 may provide one or two sets of motors. One motor utilizes the radial field flux and is referred to as the radial field HARM motor. The other motor set uses axial field fluxes and are referred to as the axial field HARM motors. HARMs 500 and 600 may provide hybridization of two or three motor configurations within a single machine, using one-rotor structure having poles in both the axial and radial directions. Unlike HARM 500, HARM 600 has only one set of axial field rotor poles 624 that extend beyond radial field rotor poles 622, along the axis of rotor shaft 611, so that axial field stator poles 623, 627 may be disposed in a manner that does not mechanically interfere with the radial and axial field stator windings 661–663.

Other features that may improve the power density characteristics of HARMs 500 and 600 include utilizing end bells 651 more effectively. These end bells are used only for mechanical integrity by related art machines. In the present invention, end bells 651 serve an electromagnetic purpose, resulting in higher power density within a given volume of space. Another feature to consider is the bore for the radial field HARM motor. Since the power output of each axial field HARM motor is proportional to the bore diameter and inner diameter of the axial rotor laminations, the power density of HARMs 500 and 600 may be improved by maximizing the bore for the radial field HARM motor. Additionally, the power density of HARMs 500 and 600 may be improved by decreasing the stack length of the radial field motor, to thereby reduce the flux path length of the axial field motors.

The structures of HARMs 500 and 600 are ideal for short stack machines and for high power density motors, such as those used in defense, servo, and spindle applications. Also, these HARMs are well suited for use in appliances and automotive accessory drives, where smaller volume and higher reliability are desirable.

HARMs 500 and 600 integrate two or three motor sets, each having an independent flux path, into one machine structure and, thereby, provide a higher electromagnetic utilization of the machine's space. Moreover, HARMs 500 and 600 provide higher reliability. A failure of one motor set, such as the radial field HARM motor, will not affect the performance and operation of the axial field HARM motors, and vice versa. Thus HARMs 500 and 600 provide uninterrupted operation even during faults and failures. Furthermore, HARMs 500 and 600 provide phase independence, due to the absence of mutual coupling between the windings of the same set. Therefore, the hybrid motor structures of HARMs 500 and 600 enhance their reliability and fault tolerance to unprecedented levels.

HARM 500 may be thought of as a 2m or 3m phase machine and HARM 600 may be though of as a 2m phase machine, if there are m phases in each of the radial and axial field HARM motors. Compared to an m phase electric motor, the structures of HARMs 500 and 600 increase the available phases from m to 2m (in the case of HARM 600) or 3m (in the case of HARM 500) and, thereby, increase the fault tolerance and reliability of the machine.

For example, suppose the radial field motor of HARM 500 has an operational reliability of R1, the first axial field motor has a reliability of R2, and the second axial field motor has a reliability of R3. The combined reliability for HARM 500 may be expressed as $1-(1-R1)*(1-(R2)$, if the second axial field motor is not used or provided. Otherwise, the combined reliability may be expressed as $1-(1-R1)*(1-R2)*(1-R3)$.

The structures of HARMs 500 and 600 do not require significantly increasing the rotor weight over that required for an m-phase RFM. The rotor iron volume of HARMs 500 and 600 may be about the same as a machine having only a radial field motor, all other things being equal. This leads to the higher power density of HARMs 500 and 600, relative to related art machines.

The hybridization concepts and structures described in relation to HARMs 500 and 600 may be extended to other machines, such as permanent magnet synchronous machines having buried or surface mount configurations. Also, these concepts and structures have universal applicability to high performance and high reliability machine applications.

A number of power converter topologies can be utilized to drive HARMs 500 and 600, some of which are described in "Switched Reluctance Motor Drives", by R. Krishnan, CRC Press, June 2001. Consider an asymmetric power converter for driving the radial and axial sets of stator windings of HARM 500. One set of stator windings 561 corresponds to the radial field motor of HARM 500. A second set of stator windings 562 corresponds to the first axial field motor, and a third set of stator windings 563 corresponds to the second axial field motor. From these three sets of stator windings 561–563, a HARM with only two equivalent stator windings may be derived.

For example, assume each of the radial and axial field motors employs four rotor poles and four stator poles. Each stator winding set 561–563 consists of windings on the four stator poles connected in series, or in parallel, depending on the source voltage. By aligning the respective stator and rotor poles of the first and second axial field motors to have no relative phase shift to each other, first and second axial field stator windings 562 and 563 may be connected in series or in parallel. Connecting first and second axial field stator windings 562 and 563 in this way effectively provides a single stator winding for the two axial field motors.

To provide starting torque for all rotor positions, which a single stator winding machine cannot provide, stator poles 587 or rotor poles 582 and 583 of the radial and axial field motors, respectively, can be shifted with respect to one another. This does not mean that the angles between poles of the same type machine are unequal. The phase shift means the relative positions of the axial and radial field poles are assembled in a way that when the axial field machine produces a maximum torque, the radial field machine produces a minimum of torque. When so shifted, the radial field motor can produce positive torque, the axial field motor can produce negative torque, and vice versa. This configuration provides continuous torque production, since either the radial field motor or the axial field motor is producing positive torque at all times. Similarly, negative torque can be produced if mechanical power is provided to the machine motors. Such positive and negative energy transfer can be achieved and controlled in both directions of rotation. Thereby, HARM 500 and its power converter set is capable of four-quadrant operation in the torque versus speed envelope.

Each of the three motors of HARM 500 and two motors of HARM 600 can be operated as a single phase machine, with the radial field motor operating as single phase machine, alone, and the two axial field motors combined to operate as a separate single phase motor. Therefore, HARMs 500 and 600 can provide four-quadrant operation using an asymmetric power converter having controllable switches. Accordingly, the phases corresponding to HARM 500's three motors or HARM 600's two motors are effectively transformed to the equivalent of a two-phase HARM motor.

Even though HARMs 500 and 600 have more than one motor, the power converter required to provide HARMs 500 and 600 with four-quadrant operability is not significantly different, if at all, from that required to provide a two-phase SRM motor with four-quadrant operability. As a result, the packaging volume and cost of a suitable power converter for HARMs 500 and 600 is not significantly different from that for a single, two-phase SRM motor. Therefore, HARMs 500 and 600 are particularly useful in cost competitive machines, such as those used in appliance and automotive applications.

A suitable power converter for HARMs 500 and 600 may use controllable switches, such as IGBTs, MOSFETs, etc., with minimum control complexity. Of noteworthiness here, is that HARMs 500 and 600 can be combined with a power converter to minimize the number of controllable switches (e.g., to two switches) required to provide four-quadrant operability. This is achievable because HARMs 500 and 600 may be configured to operate as the equivalent of a two-stator phase SRM, with its attendant low requirement of controllable switches in the converter.

By treating the first and second axial field motors separately, three independent motors are obtained in HARM 500. When the set of windings corresponding to a motor are connected in series and treated as a single phase machine, for each of the three motors, HARMs 500 and 600 may be operated equivalently to a three phase or two phase SRM, respectively. In this case, the power converter requirements will be similar to those of the three-phase SRM.

HARMs 500 and 600 may be integrated with a power converter in a manner designed to provide high reliability. For example, assume a power converter is integrated with HARM 500 or 600 such that the combined structure has one radial field motor with a set of m stator phases and one axial field motor with a set of n stator phases. Further assume that each rotor and stator phase is separately and independently driven by a power converter phase. For this configuration, the total number of independent phases for operation is equal to the sum of m and n. This increases the reliability of the machine operation from m phases to m+n phases. Even though this configuration requires additional converter phases, the advantage of higher reliability is evident.

In order to achieve the same amount of reliability, a related art machine has to be fitted with m+n stator phases. This may not always be possible, due to manufacturing tolerance limitations, when m+n is a larger number than say 5.

Operating HARM 500's first and second axial field stators independently increases the number of independent phases to m+2n, assuming the radial field-motor has m independent stator phases and the axial field motors have n independent stator phases. This is a substantial increase of independent stator phases, compared to a one stator set machine having m independent stator phases. Assuming m=n, this configuration of HARM 500 provides three times more independent phases than the one stator set machine. Clearly, HARM 500 can provide extremely high reliability and fault tolerance. When high reliability or fault tolerance is not required, HARMs 500 and 600 may be configured to operate equivalently to a HARM having a low number of stator phases.

HARM 500 and 600 provide the following advantages:
1. A HARM that may be configured to provide either a low or high number of phases.
2. A HARM with as many as m+2n phases (or m+n in the case of HARM 600) that can be operated independently.
3. A highly reliable HARM providing numerous HARM motors.
4. When used as a generator, the HARM can provide three independent power sources and failure of one will not lead to failure of the others. Hence, this HARM provides high reliability during generation, also.
5. Because the HARM may have a large number of phases, the torque ripple is very low and its frequency will be very high, so that it may be more easily filtered by the mechanical system. Reducing the torque ripple is achieved by the large number of phases, rather than by sophisticated current control.
6. The HARM increases the power density in a step fashion, and not incrementally.
7. The HARM increases the reliability and fault tolerance by a factor of two or three, depending upon how it is configured.
8. The HARM enables independent operation of its two or three sets of motors (one or two sets of motors in HARM 600), without any electromagnetic coupling between them.
9. A single rotor serves as the rotor for all motor stators, thereby no additional weight is added to the HARM. This feature leads to the highest utilization of the rotor volume, which has been hitherto untapped.
10. The HARM's end bells carry the stator laminations and windings for the two axial field motors of the HARM, resulting in higher utilization of the available surface for electromagnetic purposes and higher power density in this hybrid structure.
11. Failure of one motor, for example the radial field motor, does not affect the performance and operation of the axial field motors. Thereby, uninterrupted operation of the hybrid machine is possible after one or two of the motors have failed. 12. If redundancy is not the top priority, then the radial and axial field stators can be paired to operate as an SRM with only one motor, having m phases instead of a machine with 2m phases, where m is the number of motor phases in each radial and axial HARM motor. This leads to minimization of the power devices in the power converter, but not necessarily to high reliability.
13. Acoustic noise in the HARM is highly minimized or eliminated, since the normal forces that tend to ovalize the machine in the radial field HARM motor (i.e., along the y axis) is balanced by the ovalizing normal forces produced by the axial field HARM motors (i.e., along the x axis). Thus, the ovalization of the stator is effectively cancelled in the machine, which is one of the chief advantages of this hybrid machine structure. Also, this feature results in low noise machines, which may have tremendous impact for various applications.
14. Load sharing can be achieved between the radial and axial field HARM motors for both the maximum load and lesser loads. For maximum loads, the maximum capacity of each motor can be exploited. The load sharing ratios of the motors may be established on the basis of efficiency. For example, the predominant motor can be configured to bear a higher portion of the load, to maximize the overall efficiency of the hybrid machine. The fact that such an arrangement and control are possible makes the machine much more flexible, most especially so in light of its high reliability.
15. The normal forces of the radial and axial field HARM motors can be individually controlled, by controlling the winding currents on each pole of the respective motors. For example, the normal forces in the x and y directions can be controlled in the radial field motors with their independent control of winding currents.

Similarly, the z and x axis normal forces can be controlled in the axial field motors with their independent control of winding currents. This presumes that the axial and radial machine sets have at least two phases in each. This means the normal forces in the x, y, and z directions are independently and individually controlled. So also, the tangential force that propels the rotor in the desired direction may be controlled by the independent operation of the motors. These two factors endow the machine with levitation and guidance control, which has not been achieved with one axial field or radial field motor. Therefore, the hybrid machine opens a class of machines that does not require a bearing for its rotation, if their normal forces are properly controlled. This may be thought of as a machine with magnetic bearings, but without an external magnetic bearing set. Instead of the external magnetic bearing, the HARM uses the power producing axial and radial field HARM motors to serve as the magnetic bearing. Therefore, this machine does away with an additional set of control windings and a control circuit that is required for a magnetic bearing. With this, a truly bearing-less machine is achieved, without requiring a separate set of magnetic bearings.

16. The HARM may also include one radial field SRM motor and an axial field permanent magnet synchronous or brushless dc machine motor. Alternatively, it may include one axial field SRM motor and a radial field permanent magnet synchronous or brushless dc machine. These alternatives exemplify how the machine may by truly hybridized, to improve the power density. Such a hybrid machine combines the best features of both kinds of motors and may find use in aerospace applications involving part time regeneration.

17. Alternatively, both the radial and axial field motors may be permanent magnet synchronous or brushless dc machine motors, with their attendant high reliability and high power density, at least up to medium speed applications.

Figure 7A:
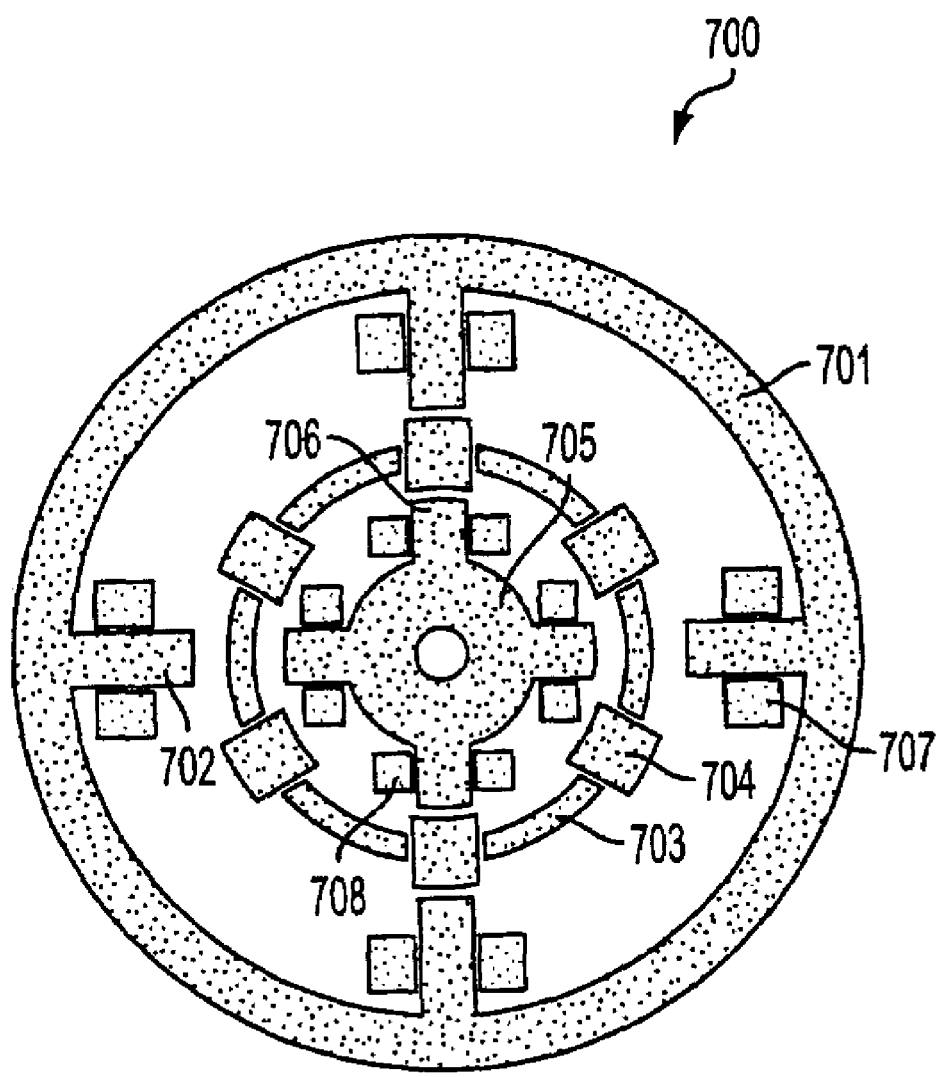
FIG. 7(a) illustrates a radial field machine (RFM) with two stators and one rotor.

FIG. 7(a) illustrates a radial field machine (RFM) with two stators and one rotor. RFM 700 includes a single radial field rotor 703 placed between an outer radial field stator 701 and an inner radial field stator 705. Although FIG. 7(a) shows four outer radial field stator poles 702 and 706 on each of the two stators 701 and 705, respectively, and six radial field rotor poles 704, RFM 700 may use any ratio or combination of stator and rotor poles. For example, it may use combinations such as 6/4, 8/6, 10/8, 8/10, 6/8, 12/10, 10/12, 12/8, 8/12, etc., where the first number identifies the number of rotor poles and the second number identifies the number of poles on each stator.

As illustrated, outer radial field stator 701 has m phases, where m=2, and inner radial field stator 705 has m phases. When outer radial field stator coils 707 are excited independently of inner radial field stator coils 708, then RFM 700 operates as a 2m-phase machine. However, each motor need not have m independent phases, but may have i and j independent phases, respectively.

Radial field rotor 703's laminations have projecting radial field rotor poles 704, which are radially oriented to conduct flux. The laminations of outer and inner radial field stators 701 and 705 have similar projecting poles 702 and 706, respectively. Outer radial field stator coils 707 are electrically isolated and independent of inner radial field stator coils 708. This ensures that in case of failure, say, of outer radial field stator coils 707, inner radial field stator coils 708 can be energized to produce output power. Thus, uninterrupted operation of the machine may be maintained even in the event of a failure.

The interpolar part of radial field rotor 703 provides the path for flux when only one of outer and inner radial field stators 701 and 705, respectively, is excited. When both sets of radial field stator coils 707 and 708 are excited, then the interpolar iron parts of radial field rotor 703 are not used to convey the flux generated by radial field stator coils 707 and 708. Instead, only radial field rotor poles 704 are used for flux travel. The interpolar parts of radial field rotor 703 are not used because the generated flux is conveyed through the sets of radially aligned outer radial field stator poles 702, radial field rotor poles 704, and inner radial field stator poles 706.

When outer and inner radial field stator coils 707 and 708, respectively, are not operated independently, they may be combined to form an m-phase machine. In this case, the power devices for the power converter may be reduced by half, as compared to the case of 2m-phase operation.

The design criterion for maximizing the power output is that radial field rotor 703's diameter has to be large, so that the power output of inner radial field stator 705 can also be large, while the outer radial field stator 701 poles can be short and produce the same power as those of inner radial field stator 705. The iron stator lamination for inner radial field stator 705 can be minimized by removing its arc portion or replacing the whole inner radial field stator 705 with strips of rectangular lamination. Removing the arcuate portion or using rectangular strips for inner radial field stator 705 increases the volume of space, which may be made available for inner radial field stator coils 708. The wide space between outer radial field stator poles 702 may be used for outer radial field stator coil 707 placement, by reducing the height of outer radial field stator poles 702 and spreading out the winding so that the overall diameter of the machine can be minimized.

RFM 700 may be an SRM or another type of electrical machine, such as a permanent magnet brushless dc machine (PMBDCM). Whatever type of machine RFM 700 is configured to be, it provides a 100% reliability increase over a similar machine having only one stator.

For example, inner radial field stator 705 and radial field rotor poles 704 may be said to form a first motor and outer radial field stator 701 and radial field rotor poles 704 may be said to form a second motor of RFM 700. Assuming the first motor has an operational reliability of R1 and the second motor has a reliability of R2, the combined reliability for RFM 700 may be expressed as $1-(1-R1)*(1-(R2)$, if the two motors are operated independently.

With a single radial field rotor 703 and two stators 701 and 705, two equivalent motors are packed into one package, to provide high power density. With two stators 701 and 705, the reliability and fault tolerance is enhanced by a factor of two, in comparison to a single stator machine.

Stators 701 and 705 can be operated independently of each other, if the interpolar material of radial field rotor 703 is magnetic steel. This feature provides the high reliability operation, since the machine may then operate with 2m phases.

Stators 701 and 705 can be operated together by combining the corresponding phases of outer radial field stator coils 707 and inner radial field stator coils 708. This preserves the power density. Since there are m machine phases for this configuration, the power devices of the associated power converter may be reduced to half the requirement for a 2m-phase machine.

Figure 7B:
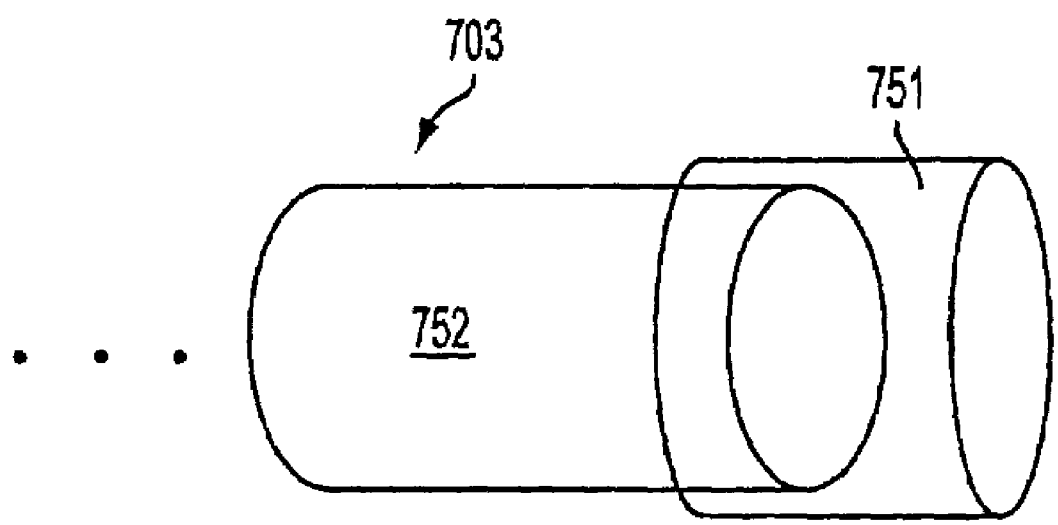
FIG. 7(b) illustrates a rotor support for the RFM illustrated by FIG. 7(a)

FIG. 7(b) illustrates a rotor support for the RFM illustrated by FIG. 7(a). Rotor support 751 secures radial field rotor 703 within RFM 700 so that radial field rotor 703 may rotate freely about its rotational axis, but may not otherwise move. When RFM 700 is configured to operate as a single motor with m independent phases, rotor support 751 and rotor back iron 752 do not conduct electromagnetic flux. Therefore, rotor support 751 may be a non-magnetic material and rotor back iron 752 need not have magnetic steel, when RFM 700 is configured as a single motor.

Figure 7C:
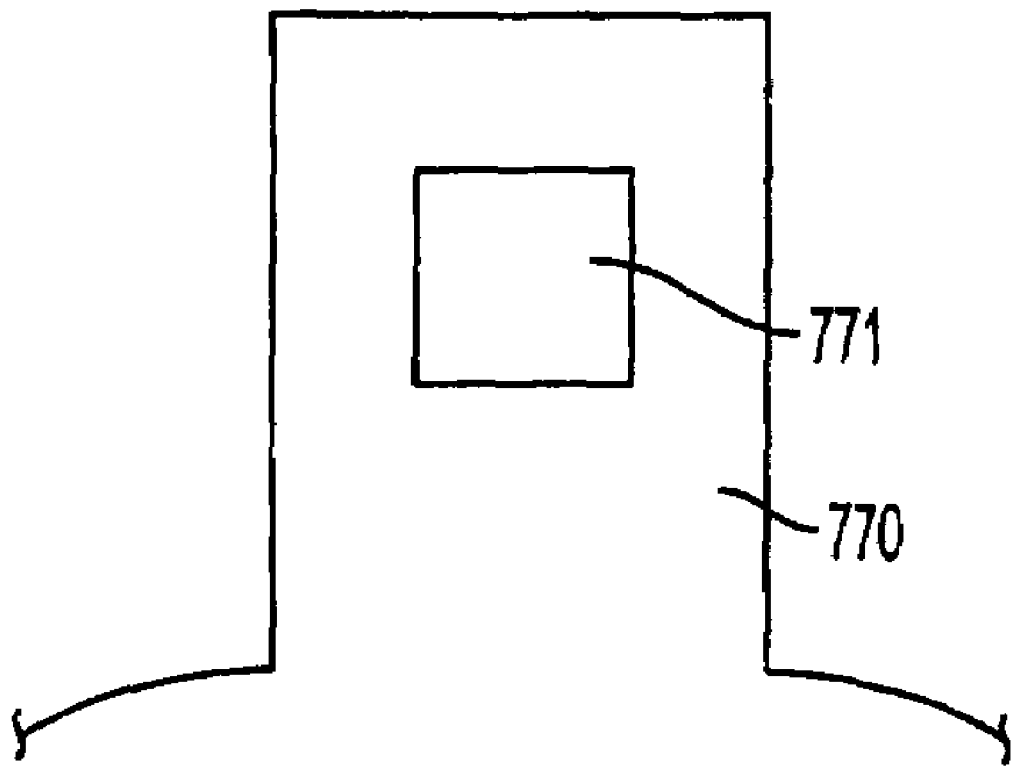
FIG. 7(c) illustrates a stator pole having a permanent magnet.

FIG. 7(c) illustrates a stator pole having a permanent magnet. Both the outer and inner radial field stators 701, 705, respectively, of RFM 700 may employ a plurality of stator poles such as stator pole 770, which has a permanent magnet 771 mounted on it. When so configured, RFM 700 may be operated as a permanent magnet brushless direct current machine.

When configured as a PMBDCM, radial field rotor 703 may have permanent magnets that are magnetized in a radial orientation. Having two stators 701 and 705 will bestow the advantages of high power density and high reliability.

When configured as an SRM and PMBDCM hybrid machine, radial field rotor 703 may have magnets in lower slots, provided thereon, and may additionally have upper slots. This hybrid configuration allows outer radial field stator 701 to provide an SRM motor and inner radial field stator 705 to provide a PMBDCM motor. Such a configuration provides a truly hybrid machine with two motors, one of each kind with the same advantages of high power density and high reliability of operation.

Opposing pairs of stator and rotor poles can be phase shifted. This leads to uniform torque generation, since inner radial field stator 705 produces maximum torque when outer radial field stator 701 produces minimum torque. Ripple torque is reduced with this configuration, without compromising the high power density and high reliability of operation. Still, the machine can be operated as a 2m- or m-phase machine.

Figure 8A:
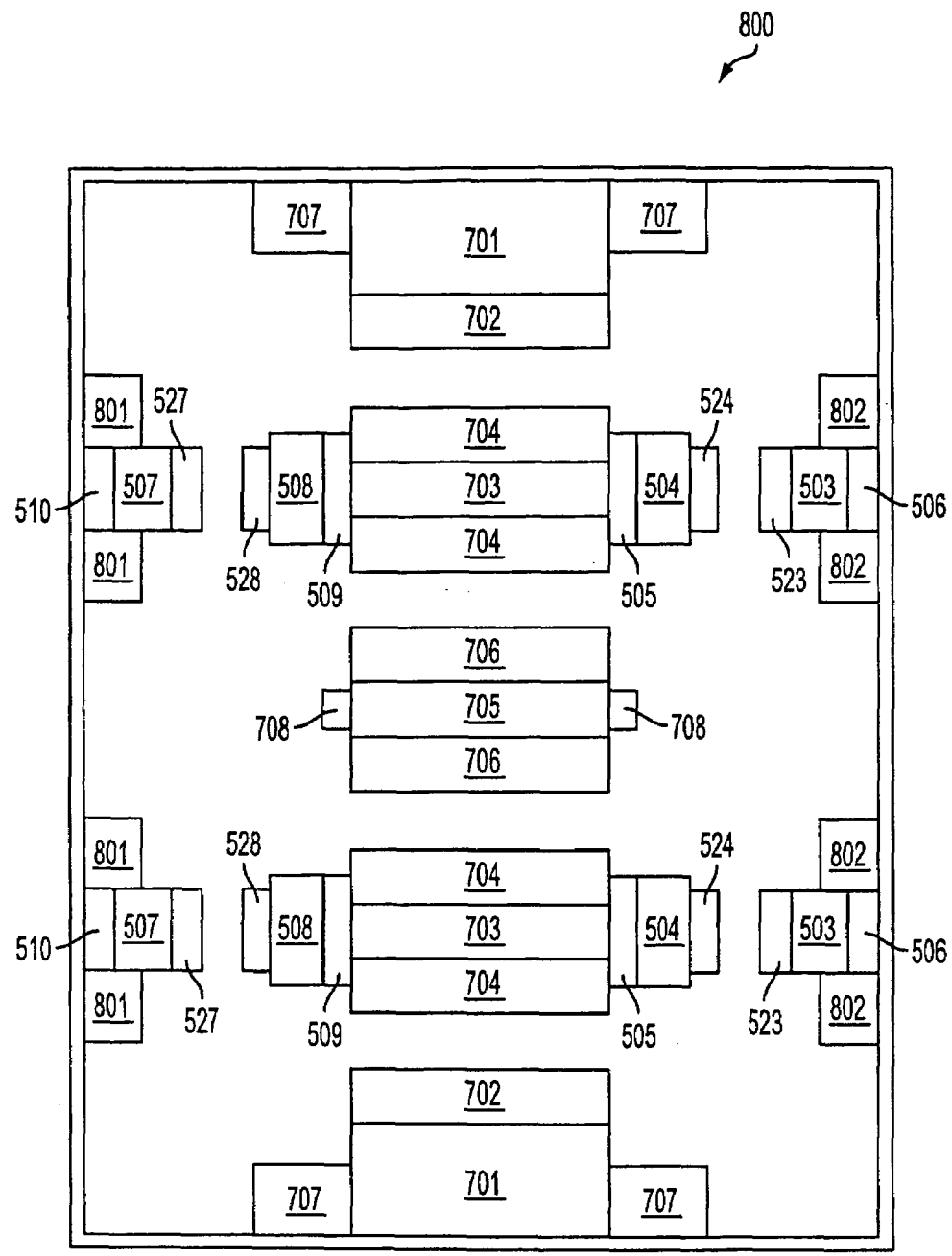
FIG. 8(a) illustrates a HARM, having two radial and two axial field motors, that combines features of the machines illustrated by FIGS. 5(a) and 7.

FIG. 8(a) illustrates a HARM, having two radial and two axial field motors, that combines features of the machines illustrated by FIGS. 5(a) and 7. HARM 800 has an outer radial field stator 701, a radial field rotor 703, an inner radial field stator 705, a first axial field stator 503, a first axial field rotor 504, a first axial field rotor back iron 505, a first axial field stator back iron 506, a second axial field stator 507, a second axial field rotor 508, a second axial field rotor back iron 509, a second axial field stator back iron 510, and a rotor shaft 511. Outer radial field stator 701 has salient outer radial field stator poles 702, radial field rotor 703 has salient radial field rotor poles 704, inner radial field stator 705 has salient inner radial field stator poles 706, first axial field stator 503 has salient first axial field stator poles 523, first axial field rotor 504 has salient first axial field rotor poles 524, second axial field stator 507 has salient second axial field stator poles 527, and second axial field rotor 508 has salient second axial field rotor poles 528.

Note that the rotor shaft is connected to 703 or integral to the rotor structure.

Figure 8B:
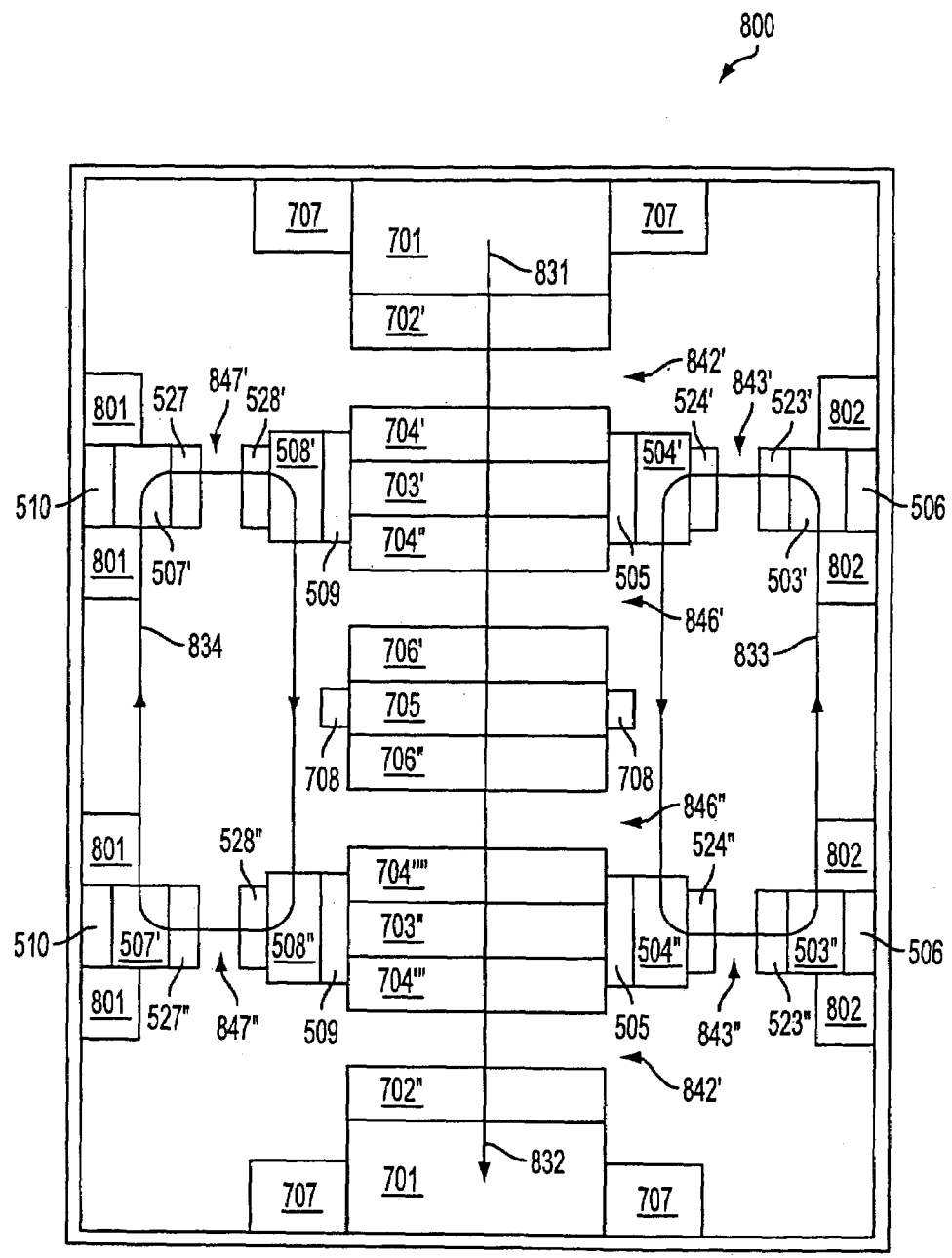
FIG. 8(b) illustrates the radial and axial field flux paths providing one direction of rotor rotation for the machine illustrated by FIG. 8(a), when the outer and inner radial stator coils are simultaneously energized.

FIG. 8(b) illustrates the radial and axial field flux paths providing one direction of rotor rotation for the machine illustrated by FIG. 8(a), when the outer and inner radial stator coils are simultaneously energized. There are two radial fluxes in this machine: (i) between the outer radial field machine comprising outer radial field stator windings 707 and outer radial field rotor poles 704' and 704''' and (ii) between inner radial field rotor poles 704'' and 704'''' and inner radial field stator poles 706. If simultaneous excitation is used and the inner and outer stator and rotor field poles are aligned, then there is only one radial flux path in the machine. A radial field flux 831 is generated by currents flowing through outer radial field stator coils 707. Radial field flux 831 flows through outer radial field stator 701 to outer radial field stator pole 702', flows across an outer radial field air gap 842' into an outer portion of radial field rotor pole 704', flows into radial field rotor 703' and then into an inner portion of radial field rotor pole 704'', flows across an inner radial field air gap 846' into inner radial field stator pole 706', and flows into inner radial field stator 705. Continuing, radial field flux 831 flows from inner radial field stator 705 into inner radial field stator poles 706'', flows across inner radial field air gap 846'' into an inner radial field rotor pole 704'''', flows into radial field rotor 703'' and then into an outer radial field rotor pole 704''', flows across outer radial field air gap 842' into outer radial field stator pole 702'', and flows into outer radial field stator 701.

A first axial field flux 833 is generated by a current flowing through first axial field stator windings 802. First axial field flux 833, flows through first axial field stator 503 to first axial field stator pole 523', flows across a first axial field air gap 843' into first axial field rotor pole 524', flows into first axial field rotor 504 and then first axial field rotor pole 524'', flows across first axial field air gap 843'' into first axial field stator pole 523'', and flows back into first axial field stator 503.

Similarly, a second axial field flux 834 is generated by a current flowing through second axial field stator windings 801. Second axial field flux 834 flows through second axial field stator 507 to second axial field stator pole 527', flows across a second axial field air gap 847' into second axial field rotor pole 528', flows into second axial field rotor 508 and then into second axial field rotor pole 528'', flows across second axial field air gap 847'' into second axial field stator pole 527'', and flows back into second axial field stator 507.

First and second axial field rotor back iron 505 and 509 prevent first and second radial field fluxes 831 and 832 from entering first and second axial field rotors 504 and 508. Similarly, first and second axial field rotor back irons 505, 509 prevent first and second axial field fluxes 833 and 834, respectively, from entering radial field rotor 703', 703''. First and second axial field stator back irons 506, 510 prevent first and second axial field fluxes 833 and 834, respectively, from entering outer and inner radial field stators 701 and 705. Similarly, first and second axial field stator back irons 506, 510 prevent first and second radial field fluxes 831 and 832 from entering axial field stators 503 and 507.

Each of radial field flux and first and second axial field fluxes 833 and 834 independently produces torque to rotate rotor 703 in the same direction about its axis of rotation. Reversing the respective field fluxes sequence will cause each to independently produce torque to rotate rotor 703 in the opposite direction.

Figure 8C:
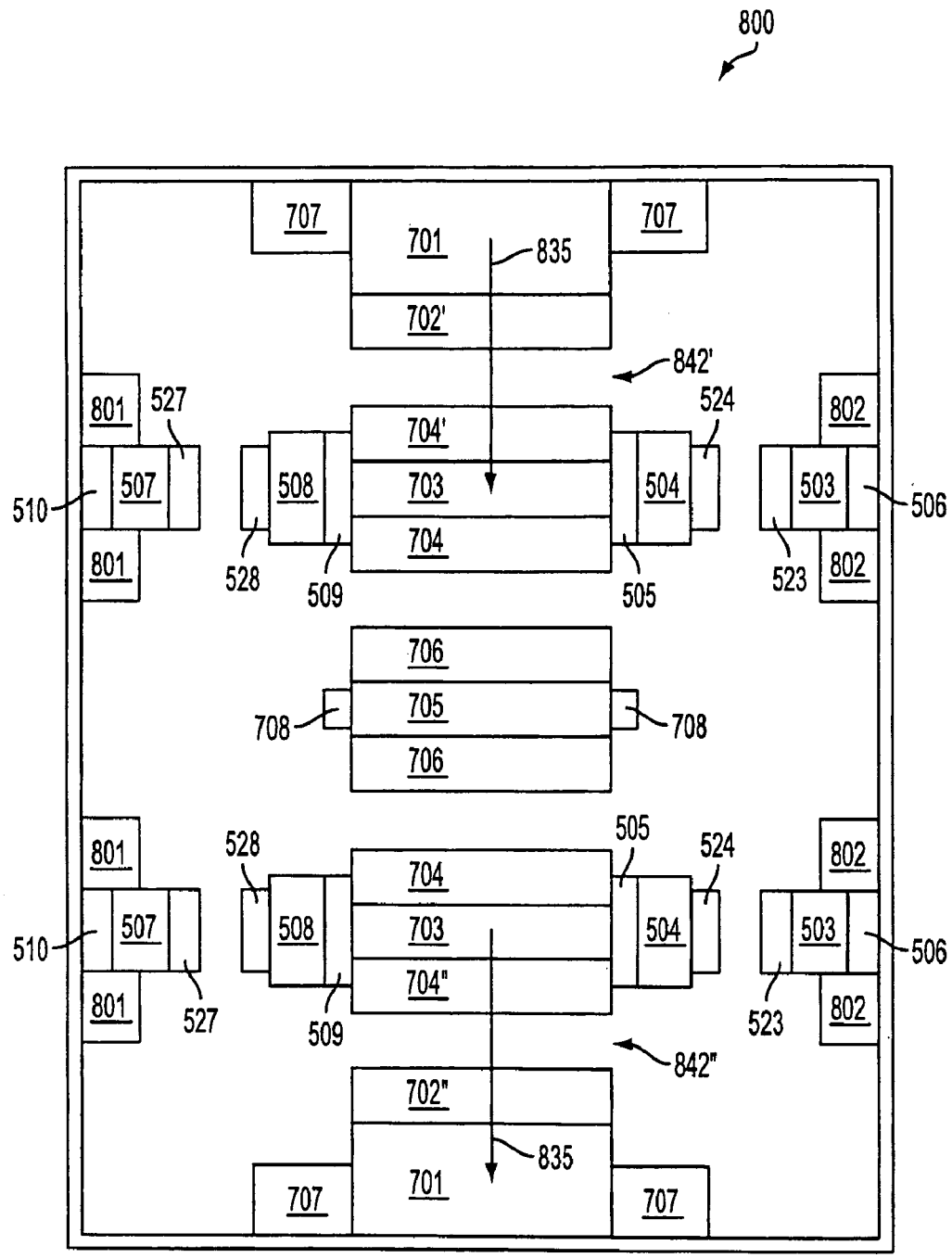
FIG. 8(c) illustrates the radial field flux paths providing one direction of rotor rotation for the machine illustrated by FIG. 8(a), when the outer and inner radial stator coils are not simultaneously energized.

FIG. 8(c) illustrates the radial field flux paths providing one direction of rotor rotation for the machine illustrated by FIG. 8(a), when the outer and inner radial stator coils are not simultaneously energized. A radial field flux 835 is generated by currents flowing through outer radial field stator coils 707. Radial field flux 835 flows through outer radial field stator 701 to outer radial field stator pole 702', flows across an outer radial field air gap 842' into an outer portion of radial field rotor pole 704', flows into radial field rotor 703 and then into an outer portion of an opposing radial field rotor pole 704'', flows across outer radial field air gap 842'' into outer radial field stator pole 702'', and flows back into outer radial field stator 701.

Likewise, it can be seen that a radial flux path due to the excitation of the inner radial field stator pole windings 708 that links only the inner radial field stator poles 706' and 706", inner radial field air gap 846' and 846", inner radial field rotor poles 704" and 704"", radial field rotor 703' and 703" back iron and inner radial field stator 705 back iron. That will contribute to two radial field motors, one with outer stator and outer part of the rotor and the other with inner stator and inner part of the rotor. It can be seen that FIG. 8(*c*) itself illustrates a HARM, having two radial and two axial field motors, that combines features of the machines illustrated by FIGS. 6(*a*) and 7.

HARM 800 combines the features illustrated by FIGS. 5(*a*) and 7 and FIGS. 6(*a*) and 7, respectively, and may also include the features illustrated by FIGS. 1(*a*), 1(*b*), and 2–4. HARM 800 has four stators, two for the radial field motors and two for the axial field motors, and either three or four sets of independent windings. More specifically, there may be either two sets of windings for the radial field stators and one set for the axial field stators or, alternatively, two sets of windings for each of the radial and axial field stators. Configured this way, HARM 800 may provide either a 3m- or 4m-phase machine, where m is the number of phases in the outer radial, inner radial, first axial, and second axial field stators. Each of these four stators need not have the same number of phases m, but may have different numbers of phases, such as i, j, k, and l phases, respectively.

When three or four phases are operated independently, HARM 800 provides a reliability that is three or four times greater than a single phase machine. For example, suppose the machine elements corresponding to the first phase have an operational reliability of R1 and the machine elements corresponding to the second through fourth phases have operational reliabilities of R2, R3, and R4, respectively. Then, the combined reliability for HARM 800 may be expressed as $1-(1-R1)*(1-R2)*(1-R3)$ for a machine having three independent phases and $1-(1-R1)*(1-R2)*(1-R3)*(1-R4)$ for a machine having four independent phases.

The power density and reliability of such a machine are far higher than that of related art machines. The reliability is enhanced by a factor of three or four by comparison to a machine with m phases. Further this invention reduces the generated acoustic noise, since the ovalization of the radial machine stator excitation is countered by the ovalization of the axial machine stator excitation.

The outer and inner radial field stators 701 and 705 and radial field rotor 703 of RFM 700 cooperate to provide the functionality of two motor sets. Both motor sets can be SRM motors, one can be an SRM motor and the other can be a PMBDCM motor, both can be PMBDCM motors, one can be an induction motor and the other an SRM motor, or one can be an induction motor and the other a PMBDCM motor.

Where both motors of RFM-700 are SRM motors, the two motor sets may be operated independently of each other, thus giving 2m independent machine phases. By tying both stators together and aligning the stator windings, RFM 700 may be operated in a manner similar to that for a single machine of m independent phases.

When the RFM 700 is configured to have both motor sets used as a single machine with m phases, the rotor back iron need not be used. The rotor poles are used for flux conduction, which enables the rotor to be lightweight. The back iron does not need to have magnetic steel to carry the flux. As a result, the rotor core losses are reduced and a higher efficiency machine is obtained.

RFM 700 may have its stators configured for single phase operation, i.e., all the windings on the stator poles can be connected in series (or in parallel) and used as a single winding on a single stator (with m=1). Therefore, the motor sets can function as a two-phase machine. This has significant control implications. First, the power converter requirements are minimized. Second, even though each motor set may be a single phase SRM, RFM 700 does not need a separate starting mechanism. The rotor or stator poles can be phase shifted, such that when one stator phase produces positive torque the other is producing negative torque and vice versa. Therefore, at all times, one motor set or the other will be able to produce positive torque. Likewise, negative torque can also be produced. Both such operations can be obtained in two directions of rotation, resulting in a four-quadrant motor drive. This arrangement avoids any special starting procedure or starting mechanism for these two motor sets.

For a conventional single-phase machine, the starting is provided by the rotor pole shaping, stator pole shaping, or by the permanent magnets on auxiliary poles. All this is avoided with RFM 700. With a conventional two-phase SRM, special methods have to be incorporated to make the machine self-starting. RFM 700 does not require any special methods for self-starting in both directions. The self-starting feature is achieved by phase shifting the stator poles of one motor relative to the stator poles of the other motor. Alternatively, the self-starting feature may be achieved by phase shifting the rotor poles.

RFM 700 employs one rotor and two stators that are concentric, but can also accommodate axial stator windings on its end bells, as exemplified by HARM 800. Thus, HARM 800 is capable of providing a minimum of three and a maximum of four independent sets of stator windings. When three independent sets of stator windings are used, HARM 800 provides a 3m machine with three stators that are electromagnetically non-interacting and independent, since the flux in one stator is independent of the other stators. When four independent sets of stator windings are used, a 4m machine is provided and its four stators are electromagnetically non-interacting and independent, since their fluxes are independent.

For HARM 800, the two radial stator windings can be connected in series. Likewise, the two axial stator windings also can be connected in series, resulting in one radial machine set and one axial machine set with m phases in each. This provides 2m independent phases for operation of the machine. Where m=1, the entire machine provides the equivalent of a two-phase machine that has self-starting capability in both directions of rotation. This provides a four-quadrant motor drive with minimum converter requirements.

RFM 700 and HARM 800 may be configured as hybrid machines having one or more different motor types. For example, their combined motor sets may be any combination of motor types. Specifically, these motor types may be selected from the group of SRM motors, PMBDCM motors, and induction motors or hybridized versions of them.

Fault-tolerance and high reliability are inherent in RFM 700 and HARM 800. Due to their numerous phases, the torque ripple is very low in these machines. This low torque ripple is not due to highly sophisticated current control, but is achieved inherently by the nature of a machine having a large number of phases.

The torque ripple frequency for RFM 700 and HARM 800 is three or four times that of conventional machines. Hence, its effect on the rotor speed dynamics of RFM 700 and HARM 800 is negligible, thus requiring only a simple controller for these machines.

Because HARM 800 employ both radial and axial motor sets, the ovalization effect due to normal forces can be balanced along the x and y axes. This balancing results in low stator accelerations and low vibrations and, hence, low acoustic noise in these machines.

The structural configurations of RFM 700 and HARM 800 allow them to be tightly packaged, thereby increasing the utilization of space provided for electromagnetic components. Therefore, these machines have extremely high power density relative to their weight or volume.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further-intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A rotor for an electrical motor, the rotor comprising:
   a radial field rotor portion having a plurality of salient radial field rotor poles;
   an axial field rotor portion having a plurality of salient axial field rotor poles; and
   an axial field rotor back iron, disposed between the axial field rotor portion and the radial field rotor portion, wherein:
   the radial field rotor poles and the axial field rotor poles are respectively oriented on the rotor to receive or convey substantially perpendicular radially and axially oriented fluxes, and
   the axial field rotor back iron substantially prevents the radial field rotor portion from providing a flow path for the axially oriented flux.

2. A rotor for an electrical motor the rotor comprising:
   a plurality of salient radial field rotor poles; and
   a plurality of salient axial field rotor poles, wherein:
   the radial field rotor poles and the axial field rotor poles are respectively oriented on the rotor to receive or convey substantially perpendicular flux fields, and
   the axial field rotor poles are disposed in corresponding interpolar regions of the radial field rotor poles.

3. The rotor of claim 2, wherein a radially distal periphery of each axial field rotor pole and a radially distal periphery of the corresponding interpolar region have the same radial distance from an axis of rotation for the rotor.

4. The rotor of claim 2, wherein a radially distal periphery of each axial field rotor pole has a radial distance from an axis of rotation for the rotor that is greater than a radial distance from the axis of rotation to a radially distal periphery of the corresponding interpolar region.

5. A rotor for an electrical motor, the rotor comprising:
   a plurality of salient radial field rotor poles;
   a plurality of salient axial field rotor poles; and
   a plurality of, wherein:
   the radial field rotor poles and the axial field rotor poles are respectively oriented on the rotor to receive or convey substantially perpendicular flux fields,
   the axial field rotor poles are disposed within the radial field rotor poles, and
   the wedges are wedged between the axial field rotor poles and the radial field rotor poles to secure the axial field rotor poles within the radial field rotor poles.

6. The rotor of claim 5, wherein the axial field rotor poles are oriented magnetic steel.

7. The rotor of claim 5, wherein:
   the radial field rotor poles have through-holes along an axis parallel to an axis of rotation for the rotor; and
   axial field laminations are disposed within the through-holes to provide the axial field rotor poles.

8. The rotor of claim 5, wherein:
   the radial field rotor poles have through-holes along an axis parallel to an axis of rotation for the rotor;
   the axial field rotor poles are disposed within the through-holes and secured within the through-holes by the wedges; and
   each of the axial field rotor poles has an air gap between each of four sides and a corresponding inner side of the respective through-hole.

9. The rotor of claim 8, wherein the wedges are welded to the corresponding axial and radial field rotor poles.

10. The rotor of claim 8, wherein the wedges are a non-magnetic material.

11. An axial-radial electric machine, comprising:
    a rotor having a radial field rotor portion and an axial field rotor portion, each of the radial field and axial field rotor portions has a plurality of salient rotor poles;
    a radial field stator having a plurality of salient stator poles that convey radially oriented electromagnetic fluxes to the radial field rotor poles;
    an axial field stator having a plurality of salient stator poles that convey axially oriented electromagnetic fluxes to the axial field rotor poles; and
    an axial field rotor back iron, disposed between the axial field rotor portion and the radial field rotor portion, that substantially prevents the radial field rotor portion from providing a flow path for the axially oriented fluxes, wherein
    the radially oriented fluxes are substantially perpendicular to the axially oriented fluxes.

12. The axial-radial electric machine of claim 11, further comprising another axial field stator having a plurality of salient stator poles that convey axially oriented electromagnetic fluxes to the axial field rotor poles.

13. The axial-radial electric machine of claim 12, further comprising:
    a first axial field stator winding wound around a first of the axial field stators; and
    a second axial field stator winding wound around a second of the axial field stators.

14. An axial-radial electric machine, comprising:
    a rotor having a radial field rotor portion and an axial field rotor portion, each of the radial field and axial field rotor portions has a plurality of salient rotor poles;
    a radial field stator having a plurality of salient stator poles that convey radially oriented electromagnetic fluxes to the radial field rotor poles;
    an axial field stator having a plurality of salient stator poles that convey axially oriented electromagnetic fluxes to the axial field rotor poles;
    a number i of independent phase windings wound around the radial field stator poles; and
    a number j of independent phase windings wound around the axial field stator poles, wherein:

the electric machine has a total number of independent phases given by the mathematical sum of i and j, and the radially oriented fluxes are substantially perpendicular to the axially oriented fluxes.

15. The axial-radial electric machine of claim 14, wherein the axial field rotor portion extends along the axial length of the rotor.

16. The axial-radial electric machine of claim 14, wherein i=j and the electric machine has 2i independent phases.

17. The axial-radial electric machine of claim 16, wherein the electric machine is a two-phase switched reluctance machine.

18. An axial-radial electric machine, comprising:
a rotor having a radial field rotor portion and an axial field rotor portion, each of the radial field and axial field rotor portions has a plurality of salient rotor poles;
a radial field stator having a plurality of salient stator poles that convey radially oriented electromagnetic fluxes to the radial field rotor poles;
an axial field stator having a plurality of salient stator poles that convey axially oriented electromagnetic fluxes to the axial field rotor poles;
another axial field stator having a plurality of salient stator poles that convey axially oriented electromagnetic fluxes to the axial field rotor poles;
a number i of independent phase windings wound around the radial field stator poles;
a number j of independent phase windings wound around the stator poles of a first of the axial field stators; and
a number k of independent phase windings wound around the stator poles of a second of the axial field stators, wherein:
the electric machine has a total number of independent phases given by the mathematical sum of i, j ,and k, and
the radially oriented fluxes are substantially perpendicular to the axially oriented fluxes.

19. The axial-radial electric machine of claim 18, wherein i=j and the electric machine has 2i+k independent phases.

20. The axial-radial electric machine of claim 18, wherein i=j=k and the electric machine has 3i independent phases.

21. The axial-radial electric machine of claim 20, wherein the electric machine is a three-phase switched reluctance machine.

22. The axial-radial electric machine of claim 11, further comprising
an axial field stator back iron, disposed between the axial field stator and a flux path of the radially oriented fluxes, that substantially prevents the axial field stator from providing a flow path for the radially oriented fluxes.

23. An axial-radial electric machine, comprising:
a rotor having a radial field rotor portion and an axial field rotor portion, each of the radial field and axial field rotor portions has a plurality of salient rotor poles;
a radial field stator having a plurality of salient stator poles that convey radially oriented electromagnetic fluxes to the radial field rotor poles;
an axial field stator having a plurality of salient stator poles that convey axially oriented electromagnetic fluxes to the axial field rotor poles;
another axial field stator having a plurality of salient stator poles that convey axially oriented electromagnetic fluxes to the axial field rotor poles;
another axial field rotor portion having a plurality of rotor poles;
a first axial field rotor back iron, disposed between a first of the axial field rotor portions and the radial field rotor portion, that substantially prevents the radial field rotor portion from providing a flow path for the axially oriented fluxes conveyed by the stator poles of a first of the axial field stators;
a second axial field rotor back iron, disposed between a second of the axial field rotor portions and the radial field rotor portion, that substantially prevents the radial field rotor portion from providing a flow path for the axially oriented fluxes conveyed by the stator poles of a second of the axial field stators;
a first axial field stator back iron, disposed between the first axial field stator and a flux path of the radially oriented fluxes, that substantially prevents the first axial field stator from providing a flow path for the radially oriented fluxes; and
a second axial field stator back iron, disposed between the second axial field stator and another flux path of the radially oriented fluxes, that substantially prevents the second axial field stator from providing a flow path for the radially oriented fluxes, wherein
the radially oriented fluxes are substantially perpendicular to the axially oriented fluxes.

24. An axial-radial electric machine, comprising:
a rotor having a radial field rotor portion and an axial field rotor portion, each of the radial field and axial field rotor portions has a plurality of salient rotor poles;
a radial field stator having a plurality of salient stator poles that convey radially oriented electromagnetic fluxes to the radial field rotor poles; and
an axial field stator having a plurality of salient stator poles that convey axially oriented electromagnetic fluxes to the axial field rotor poles, wherein:
the radially oriented fluxes are substantially perpendicular to the axially oriented fluxes,
either the radial field stator poles or the radial field rotor poles are phase shifted with respect to one another, so as to provide either positive or negative torque to the rotor at all resting rotor positions when the radial oriented fluxes are applied to the radial field rotor poles,
either the axial field stator poles or the axial field rotor poles are phase shifted with respect to one another, so as to provide either positive or negative torque to the rotor at all resting rotor positions when the axially oriented fluxes are applied to the axial field rotor poles, and
the electric machine is capable of self-starting and four-quadrant torque operation under the influence of a two-phase switched reluctance machine power converter.

25. An axial-radial electric machine, comprising:
a rotor having a radial field rotor portion and an axial field rotor portion, each of the radial field and axial field rotor portions has a plurality of salient rotor poles;
a radial field stator having a plurality of salient stator poles that convey radially oriented electromagnetic fluxes to the radial field rotor poles;
an axial field stator having, a plurality of salient stator poles that convey axially oriented electromagnetic fluxes to the axial field rotor poles; and
another axial field stator having a plurality of salient stator poles that convey axially oriented electromagnetic fluxes to the axial field rotor poles, wherein:
the radially oriented fluxes are substantially perpendicular to the axially oriented fluxes,
either the radial field stator poles or the radial field rotor poles are phase shifted with respect to one another, so as to provide either positive or negative torque to the rotor at all resting rotor positions when the radial oriented fluxes are applied to the radial field rotor poles, either the stator poles of a first of the axial field stators or the axial field rotor poles are phase shifted with respect to one another, so as to provide either positive or negative torque to the rotor at all resting rotor positions when the axially oriented fluxes are applied to the axial field rotor poles, and the electric machine is capable of self-starting and four-quadrant torque operation under the influence of a two-phase switched reluctance machine power converter.

26. An axial-radial electric machine, comprising:

a rotor having a radial field rotor portion and an axial field rotor portion, each of the radial field and axial field rotor portions has a plurality of salient rotor poles;

a radial field stator having a plurality of salient stator poles that convey radially oriented electromagnetic fluxes to the radial field rotor poles; and an axial field stator having a plurality of salient stator poles that convey axially oriented electromagnetic fluxes to the axial field rotor poles, wherein:

the radially oriented fluxes are substantially perpendicular to the axially oriented fluxes, the radial field stator and the radial field rotor portion cooperate to provide the operation of a first motor, the axial field stator and the axial field rotor portion cooperate to provide the operation of a second motor, the first motor is one of a switched reluctance motor, a permanent magnet direct current motor, or an inductance motor, the second motor is one of a switched reluctance motor, a permanent magnet direct current motor, or an inductance motor, and the first and second motors are different types of motors.

27. An axial-radial electric machine, comprising:

a rotor having a radial field rotor portion and an axial field rotor portion, each of the radial field and axial field rotor portions has a plurality of salient rotor poles;

a radial field stator having a plurality of salient stator poles that convey radially oriented electromagnetic fluxes to the radial field rotor poles;

an axial field stator having a plurality of salient stator poles that convey axially oriented electromagnetic fluxes to the axial field rotor poles; and another axial field stator having a plurality of salient stator poles that convey axially oriented electromagnetic fluxes to the axial field rotor poles, wherein:

the radial field stator and the radial field rotor portion cooperate to provide the operation of a first motor, a first of the axial field stators cooperates with the radial field rotor portion to provide the operation of a second motor, a second of the axial field stators cooperates with the axial field rotor portion to provide the operation of a third motor, the first motor is one of a switched reluctance motor, a permanent magnet direct current motor, or an inductance motor, the second motor is one of a switched reluctance motor, a permanent magnet direct current motor, or an inductance motor, the third motor is one of a switched reluctance motor, a permanent magnet direct current motor, or an inductance motor, two of the first, second, and third motors are different types of motors, and the radially oriented fluxes are substantially perpendicular to the axially oriented fluxes.

28. The axial-radial electric machine of claim 27, wherein the first, second, and third motors are different types of motors.

29. A coaxial electric machine, comprising:

a rotor having a plurality of salient inner and outer peripheral rotor poles;

an outer stator having a plurality of salient stator poles that convey outer electromagnetic fluxes to the outer peripheral rotor poles; and an inner stator having a plurality of salient stator poles that convey inner electromagnetic fluxes to the inner peripheral rotor poles, wherein the inner and outer electromagnetic fluxes are both radially oriented with respect to an axis of rotation for the rotor.

30. The coaxial electric machine of claim 29, further comprising:

a number i of independent phase windings wound around the outer stator poles; and a number j of independent phase windings wound around the inner stator poles, wherein interpolar regions of the rotor are magnetic steel, and the electric machine has a total number of independent phases given by the mathematical sum of i and j.

31. The coaxial electric machine of claim 30, wherein i=j and the electric machine has 2i independent phases.

32. The coaxial electric machine of claim 31, wherein the electric machine is a two-phase switched reluctance machine.

33. The coaxial electric machine of claim 30, wherein:

each of the independent phase windings of the outer stator are connected to corresponding inner stator phase windings having the same phase; and the electric machine has i independent operational phases.

34. The coaxial electric machine of claim 29, wherein:

the outer stator and the outer rotor poles cooperate to provide the operation of a first motor, which has an operational reliability of R1; and the inner stator and the inner rotor poles cooperate to provide the operation of a second motor, which has an operational reliability of R2, wherein the electric machine has a combined operational reliability expressed by $1-(1-R1)*(1-R2)$.

35. The coaxial electric machine of claim 34, further comprising:

permanent magnets that are mounted on the inner rotor poles, wherein the first motor is a switched reluctance motor, and the second motor is a permanent magnet brushless direct current motor.

36. The coaxial electric machine of claim 34, further comprising:

permanent magnets that are mounted on the outer rotor poles, wherein the first motor is a permanent magnet brushless direct current motor, and the second motor is a switched reluctance motor.

37. The coaxial electric machine of claim 34, wherein:

the first motor is one of a switched reluctance motor, a permanent magnet brushless direct current motor, or an inductance motor;

the second motor is one of a switched reluctance motor, a permanent magnet brushless direct current motor, or an inductance motor; and the first and second motors are different types of motors.

38. The coaxial electric machine of claim 29, further comprising permanent magnets that are magnetized in a radial orientation and mounted on the rotor and the outer and inner stators to provide a permanent magnet brushless direct current electric machine.

39. The coaxial electric machine of claim 29, wherein:
either the outer rotor poles are phase shifted with respect to the outer stator poles or the outer stator poles are phase shifted with respect to the outer rotor poles, so as to provide either positive or negative torque to the rotor at all resting rotor positions when the outer electromagnetic fluxes are applied to the outer rotor poles;
either the inner rotor poles are phase shifted with respect to the inner stator poles or the inner stator poles are phase shifted with respect to the inner rotor poles, so as to provide either positive or negative torque to the rotor at all resting rotor positions when the inner electromagnetic fluxes are applied to the inner rotor poles; and
the electric machine is capable of self-starting and four-quadrant torque operation under the influence of a two-phase switched reluctance machine power converter.

40. The coaxial electric machine of claim 29, wherein a back iron of the rotor is not magnetic steel.

41. The coaxial electric machine of claim 29, further comprising a nonmagnetic support for the rotor.

42. An axial-radial electric machine, comprising:
a rotor having a radial field rotor and an axial field rotor, the radial field rotor having a plurality of salient inner and outer peripheral rotor poles and the axial field rotor having a plurality of salient rotor poles; and
an outer radial field stator having a plurality of salient stator poles that convey outer radially oriented electromagnetic fluxes to the outer peripheral radial field rotor poles;
an inner radial field stator having a plurality of salient stator poles that convey inner radially oriented electromagnetic fluxes to the inner peripheral radial field rotor poles; and
an axial field stator having a plurality of salient stator poles that convey axially oriented electromagnetic fluxes to the axial field rotor poles, wherein
the radially oriented fluxes are substantially perpendicular to the axially oriented fluxes.

43. The axial-radial electric machine of claim 42, further comprising another axial field stator having a plurality of salient stator poles that convey axially oriented electromagnetic fluxes to the axial field rotor poles.

44. The axial-radial electric machine of claim 43, further comprising:
a first axial field stator winding wound around a first of the axial field stators; and
a second axial field stator winding wound around a second of the axial field stators.

45. The axial-radial electric machine of claim 43, further comprising:
a number i of independent phase windings wound around the outer radial field stator poles;
a number j of independent phase windings wound around the inner radial field stator poles;
a number k of independent phase windings wound around the poles of a first of the axial field stators; and
a number l of independent phase windings wound around the poles of a second of the axial field stators, wherein
the electric machine has a total number of independent phases given by the mathematical sum of i, j, k, and l.

46. The axial-radial electric machine of claim 45, wherein i=j=k=l and the electric machine has 4i independent phases.

47. The axial-radial electric machine of claim 43, wherein:
the outer radial field stator and the outer radial field rotor poles cooperate to provide the operation of a first motor which has an operational reliability of R1; and
the inner radial field stator and the inner radial field rotor poles cooperate to provide the operation of a second motor which has an operational reliability of R2;
a first of the axial field stators cooperates with the axial field rotor to provide the operation of a third motor, which has an operational reliability of R3; and
a second of the axial field stators cooperates with the axial field rotor to provide the operation of a fourth motor, which has an operational reliability of R4, wherein
the electric machine has a combined operational reliability expressed by $1-(1-R1)*(1-R2)*(1-R3)*(1-R4)$.

48. The axial-radial electric machine of claim 47, wherein:
the first motor is one of a switched reluctance motor, a permanent magnet direct current motor, or an inductance motor;
the second motor is one of a switched reluctance motor, a permanent magnet direct current motor, or an inductance motor;
the third motor is one of a switched reluctance motor, a permanent magnet direct current motor, or an inductance motor;
the fourth motor is one of a switched reluctance motor, a permanent magnet direct current motor, or an inductance motor; and
two of the first, second, third, and fourth motors are different types of motors.

49. The axial-radial electric machine of claim 48, wherein three of the first, second, third, and fourth motors are different types of motors.

50. The axial-radial electric machine of claim 48, wherein all of the first, second, third, and fourth motors are different types of motors.

51. The axial-radial electric machine of claim 43, further comprising:
another axial field rotor having a plurality of rotor poles;
a first axial field rotor back iron, disposed between a first of the axial field rotors and the radial field rotor, that substantially prevents the radial field rotor from providing a flow path for the axially oriented fluxes conveyed by the stator poles of a first of the axial field stators;
a second axial field rotor back iron, disposed between a second of the axial field rotors and the radial field rotor, that substantially prevents the radial field rotor from providing a flow path for the axially oriented fluxes conveyed by the stator poles of a second of the axial field stators;
a first axial field stator back iron, disposed between the first axial field stator and a flux path of the outer and inner radially oriented fluxes, that substantially prevents the first axial field stator from providing a flow path for the outer and inner radially oriented fluxes; and
a second axial field stator back iron, disposed between the second axial field stator and a flux path of the outer and inner radially oriented fluxes, that substantially prevents the second axial field stator from providing a flow path for the outer and inner radially oriented fluxes.

52. The axial-radial electric machine of claim 43, further comprising:

a number i of independent phase windings wound around the inner and outer radial field stator poles; and a number j of independent phase windings wound around the poles of both a first of the axial field stators and a second of the axial field stators, wherein the electric machine has a total number of independent phases given by the mathematical sum of i and j.

53. The axial-radial electric machine of claim 52, wherein the electric machine is a two-phase switched reluctance machine that is capable of four-quadrant torque operation and self-starting from any rest position of the rotor, under the influence of a two-phase switched reluctance power converter.

54. The axial-radial electric machine of claim 42, wherein the axial field rotor extends along the axial length of the rotor.

55. The axial-radial electric machine of claim 42, further comprising:

a number i of independent phase windings wound around the outer radial field stator poles;

a number j of independent phase windings wound around the inner radial field stator poles; and a number k of independent phase windings wound around the axial field stator poles, wherein the electric machine has a total number of independent phases given by the mathematical sum of i, j, and k.

56. The axial-radial electric machine of claim 55, wherein i=j and the electric machine has 2i+k independent phases.

57. The axial-radial electric machine of claim 55, wherein i=j=k and the electric machine has 3i independent phases.

58. The axial-radial electric machine of claim 57, wherein the electric machine is a three-phase switched reluctance machine.

59. The axial-radial electric machine of claim 42, wherein:

the outer radial field stator and the outer radial field rotor poles cooperate to provide the operation of a first motor which has an operational reliability of R1; and the inner radial field stator and the inner radial field rotor poles cooperate to provide the operation of a second motor, which has an operational reliability of R2; and the axial field stator and the axial field rotor cooperate to provide the operation of a third motor, which has an operational reliability of R3, wherein the electric machine has a combined operational reliability expressed by $1-(1-R1)*(1-R2)*(1-R3)$.

60. The axial-radial electric machine of claim 59, wherein:

the first motor is one of a switched reluctance motor, a permanent magnet direct current motor, or an inductance motor;

the second motor is one of a switched reluctance motor, a permanent magnet direct current motor, or an inductance motor;

the third motor is one of a switched reluctance motor, a permanent magnet direct current motor, or an inductance motor; and two of the first, second, and third motors are different types of motors.

61. The axial-radial electric machine of claim 60, wherein the first, second, and third motors are different types of motors.

62. The axial-radial electric machine of claim 42, further comprising:

an axial field rotor back iron, disposed between the axial field rotor and the radial field rotor, that substantially prevents the radial field rotor from providing a flow path for the axially oriented fluxes; and an axial field stator back iron, disposed between the axial field stator and a flux path of the inner and outer radially oriented fluxes, that substantially prevents the axial field stator from providing a flow path for the inner and outer radially oriented fluxes.

63. The axial-radial electric machine of claim 42, wherein:

the inner radial field stator poles and the inner radial field rotor poles cooperate to provide the functionality of a first motor;

the outer radial field stator poles and the outer radial field rotor poles cooperate to provide the functionality of a second motor;

the axial field stator poles and the axial field rotor poles cooperate to provide the functionality of a third motor;

the corresponding rotor and stator poles of at least two of the first, second, and third motors are phase shifted with respect to one another, so as to provide either positive or negative torque to the rotor at all resting rotor positions when the radially or axially oriented fluxes are applied to the corresponding rotor and stator poles; and the electric machine is capable of self-starting and four-quadrant torque operation under the influence of a two-phase switched reluctance machine power converter.

64. The axial-radial electric machine of claim 42, further comprising:

a number i of independent phase windings wound around the inner and outer radial field stator poles; and a number j of independent phase windings wound around the axial field stator poles, wherein the electric machine has a total number of independent phases given by the mathematical sum of i and j.

65. The axial-radial electric machine of claim 64, wherein i=j and the electric machine has 2i independent phases.

66. The axial-radial electric machine of claim 65, wherein the electric machine is a two-phase switched reluctance machine that is capable of four-quadrant torque operation and self starting from any rest position of the rotor, under the influence of a two-phase switched reluctance power converter.

* * * * *